United States Patent
Ardiff et al.

(10) Patent No.: US 11,066,765 B2
(45) Date of Patent: Jul. 20, 2021

(54) UHMWPE FIBER AND METHOD TO PRODUCE

(71) Applicant: HONEYWELL INTERNATIONAL INC., Morris Plains, NJ (US)

(72) Inventors: Henry Gerard Ardiff, Chesterfield, VA (US); Ralf Klein, Midlothian, VA (US); John Armstrong Young, Midlothian, VA (US); Thomas Tam, Chesterfield, VA (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 149 days.

(21) Appl. No.: 15/897,585

(22) Filed: Feb. 15, 2018

(65) Prior Publication Data

US 2018/0179679 A1    Jun. 28, 2018

Related U.S. Application Data

(62) Division of application No. 14/533,070, filed on Nov. 4, 2014, now Pat. No. 9,909,240.

(51) Int. Cl.
*D04H 1/58* (2012.01)
*C08J 5/06* (2006.01)
(Continued)

(52) U.S. Cl.
CPC ............... *D04H 1/58* (2013.01); *C08J 5/06* (2013.01); *D06M 10/025* (2013.01);
(Continued)

(58) Field of Classification Search
CPC ........ D04H 1/58; D06M 5/53; D06M 15/572; D06M 10/025; C08J 5/06
See application file for complete search history.

(56) References Cited

U.S. PATENT DOCUMENTS

| 4,091,855 A | 5/1978 | Sibilia et al. |
| 4,413,110 A | 11/1983 | Kavesh et al. |

(Continued)

FOREIGN PATENT DOCUMENTS

| CN | 101532239 A | 9/2009 |
| EP | 198565 | 10/1986 |

(Continued)

OTHER PUBLICATIONS

O.S. Kolluri, S.L. Kaplan, and P.W. Rose, "Gas Plasma and the Treatment of Advanced Fibers," presentation to the Society of Plastics Engineers Advanced Polymer Composites, 1988 Technical Conference, Los Angeles, CA, Nov. 1988, pp. 1-8.

(Continued)

*Primary Examiner* — Jeremy R Pierce
(74) *Attorney, Agent, or Firm* — Roberts & Roberts, LLP; Richard S. Roberts, Jr.

(57) ABSTRACT

Processes for preparing ultra-high molecular weight polyethylene fibers, and the fibers and articles produced therefrom. Exposed surfaces of the fibers are subjected to a treatment that enhances the surface energy at the fiber surfaces. Such treated surfaces are subsequently coated with a protective coating immediately after the treatment to increase the shelf life of the treatment. The coating comprises at least one poly(alkyl-oxide) polymer.

16 Claims, 4 Drawing Sheets

(51) Int. Cl.
*D06M 10/02* (2006.01)
*D06M 15/53* (2006.01)
*D06M 15/572* (2006.01)
*D06M 101/20* (2006.01)

(52) U.S. Cl.
CPC .......... *D06M 15/53* (2013.01); *D06M 15/572* (2013.01); *D06M 2101/20* (2013.01)

(56) References Cited

U.S. PATENT DOCUMENTS

| | | |
|---|---|---|
| 4,457,985 A | 7/1984 | Harpell et al. |
| 4,563,392 A | 1/1986 | Harpell et al. |
| 5,001,008 A | 3/1991 | Tokita et al. |
| 5,032,338 A | 7/1991 | Weedon et al. |
| 5,075,904 A | 12/1991 | Shirasaki et al. |
| 5,108,780 A | 4/1992 | Pitt et al. |
| 5,139,873 A | 8/1992 | Rebouillat |
| 5,221,432 A | 6/1993 | Choe et al. |
| 5,352,480 A | 10/1994 | Hansen et al. |
| 5,421,378 A | 6/1995 | Bowers et al. |
| 5,582,644 A | 12/1996 | Gaddis et al. |
| 5,702,657 A | 12/1997 | Yoshida et al. |
| 6,007,584 A | 12/1999 | Suzuki et al. |
| 6,268,301 B1 | 7/2001 | Dalman et al. |
| 6,291,594 B1 | 9/2001 | Rodrigues |
| 6,607,859 B1 | 8/2003 | Tanaka et al. |
| 7,935,283 B2 | 5/2011 | Tam et al. |
| 7,964,518 B1* | 6/2011 | Bhatnagar ................ B32B 5/26 442/134 |
| 8,022,160 B2 | 9/2011 | Dirks et al. |
| 8,022,171 B2 | 9/2011 | Goossens et al. |
| 8,057,897 B2 | 11/2011 | Tam et al. |
| 8,080,486 B1 | 12/2011 | Bhatnagar et al. |
| 9,023,450 B2 | 5/2015 | Tam et al. |
| 9,023,451 B2 | 5/2015 | Tam et al. |
| 9,023,452 B2 | 5/2015 | Tam et al. |
| 9,163,335 B2 | 10/2015 | Tam et al. |
| 9,168,719 B2 | 10/2015 | Tam et al. |
| 2003/0033655 A1 | 2/2003 | Kavesh |
| 2003/0049985 A1 | 3/2003 | Pinton et al. |
| 2003/0199215 A1 | 10/2003 | Bhatnagar et al. |
| 2004/0023580 A1 | 2/2004 | Hand et al. |
| 2004/0077517 A1 | 4/2004 | Boeckh et al. |
| 2004/0258909 A1* | 12/2004 | Tam ........................ D02G 3/404 442/164 |
| 2005/0093200 A1 | 5/2005 | Tam et al. |
| 2006/0012069 A1 | 1/2006 | Smit et al. |
| 2006/0040576 A1* | 2/2006 | Citterio ................ F41H 5/0485 442/135 |
| 2007/0172594 A1 | 7/2007 | Sauer et al. |
| 2008/0305331 A1 | 12/2008 | Tam et al. |
| 2009/0093180 A1 | 4/2009 | Park et al. |
| 2009/0115099 A1 | 5/2009 | Goossens et al. |
| 2009/0158492 A1 | 6/2009 | Yao |
| 2009/0163105 A1 | 6/2009 | Ardiff et al. |
| 2009/0282596 A1 | 11/2009 | Carbajal et al. |
| 2009/0305038 A1 | 12/2009 | Duran et al. |
| 2010/0048076 A1 | 2/2010 | Creyghton et al. |
| 2010/0173156 A1 | 7/2010 | Morin |
| 2010/0204427 A1 | 8/2010 | Ren |
| 2010/0260976 A1 | 10/2010 | Kano et al. |
| 2010/0268331 A1 | 10/2010 | Simmelink et al. |
| 2011/0045293 A1 | 2/2011 | Tam et al. |
| 2011/0117351 A1* | 5/2011 | Sauer ...................... B32B 27/04 428/221 |
| 2011/0191928 A1 | 8/2011 | Ardiff et al. |
| 2011/0245399 A1 | 10/2011 | Pajerski et al. |
| 2011/0266710 A1 | 11/2011 | Tam et al. |
| 2011/0268967 A1 | 11/2011 | Tam et al. |
| 2011/0269359 A1 | 11/2011 | Tam et al. |
| 2012/0004358 A1 | 1/2012 | Tam et al. |
| 2012/0053689 A1 | 3/2012 | Martin et al. |
| 2012/0204322 A1 | 8/2012 | Fukushima et al. |
| 2012/0270454 A1 | 10/2012 | Chiou et al. |
| 2013/0059112 A1 | 3/2013 | Tam et al. |
| 2013/0059496 A1* | 3/2013 | Ardiff ................ D06M 10/025 442/187 |
| 2013/0295808 A1 | 11/2013 | Firouzi et al. |
| 2014/0030947 A1 | 1/2014 | Ardiff et al. |
| 2014/0065913 A1 | 3/2014 | Klein et al. |
| 2014/0072758 A1 | 3/2014 | Arvidson et al. |
| 2014/0212612 A1 | 7/2014 | Sbriglia |
| 2016/0032082 A1 | 2/2016 | Matsumoto et al. |

FOREIGN PATENT DOCUMENTS

| | | |
|---|---|---|
| EP | 0311197 | 4/1989 |
| EP | 1818433 | 8/2007 |
| GB | 1477416 | 6/1977 |
| JP | S59-047476 | 3/1984 |
| JP | S63-211375 | 9/1988 |
| JP | 2001262469 | 9/2001 |
| JP | 2001303467 | 10/2001 |
| JP | 2004-149980 | 5/2004 |
| JP | 2005179840 | 7/2005 |
| TW | 201104026 | 2/2011 |
| WO | 93/00389 | 1/1993 |
| WO | 2013085581 | 6/2013 |
| WO | 2013101309 | 7/2013 |
| WO | 2014053601 | 4/2014 |

OTHER PUBLICATIONS

S. P. Lin, et al., "Surface Modification and Physical Properties of Various UHMWPE-Fiber-Reinforced Modified Epoxy Composites," Journal of Applied Polymer Science, DOI 10.1002, Wiley Periodicals, Inc., vol. 104, 655-665 (2007).
Bajaj, Pushpa; "Finishing of Textile Materials," Journal of Applied Polymer Science, vol. 83, pp. 139-169 (2001).
Yim et al. "Interfacial shear strength studies of plasma-treated ultra-high molecular weight polyethylene fibers." AIChE 100—2008, AIChE Annual Meeting, Conference Proceedings, 2008 Nov. 16, 2008-Nov. 21, 2008.
Bhatnagar, "Lightweight Ballistic Composites," Woodhead Publishing Limited, England, pp. 282-283 (2006).
Zhang et al., "Effects of Air Plasma Treatment on Tribological Properties of Hybrid PTFE/Kevlar Fabric Composite," Journal of Applied Polymer Science, vol. 114, pp. 3980-3986 (Aug. 19, 2009).
Du Pont Kevlar, Innovative Performance Solutions.
Gao et al.; "Surface Modification of Ultrahigh Molecular Weight Polyethylene Fiber by Plasma Treatment," Journal of Applied Polymer Science, vol. 47, pp. 2065-2071 (1993).
Zheng et al.; "Chemical Modification Combined With Corona Treatment of UHMWPE Fibers and Their Adhesion to Vinylester Resin," Journal of Adhesion Science Technology, vol. 20, No. 10, pp. 1047-1059 (2006).
Horrocks et al.; The Handbook of Technical Textiles ; p. 60 (2000).
Wang et al.; "Surface Modification of Ultra High Modulus Polyethylene Fibers by an Atmospheric Pressure Plasma Jet," Journal of Applied Polymer Science, vol. 108; pp. 25-33 (2007).
Bahadur et al.; Principles of Polymer Science; Alpha Science International Ltd.; p. 209 (2005).
Bergfeld et al.; Safety Assessment of Alkyl PEG/PPG Ethers As Used in Cosmetics (2013).
Takagi, "Strength of Fibers Polymer," vol. 9, No. 7, pp. 496-502 (1960).
Matsumoto et al., "Toughness of Textile Fibers," Journal of the Textile Machinery Society of Japan, vol. 42, No. 3&4, pp. 66-71 (1996) (equivalent to Matsumoto et al., "Toughness of Textile Fibers," Journal of the Textile Machinery Society of Japan, vol. 47, No. 12, pp. T306-T312 (1994)).
Igarashi, et al., "Effects of the Size in Glass and Carbon Fiber on the Characteristics of the Interfacial Zone between the Bundled Fiber and Cement Paste Matrix," Proceedings of the Japan Concrete Institute, 1993, vol. 15, No. 1, p. 969-974.

* cited by examiner

UHMWPE FIBER AND METHOD TO PRODUCE

CROSS-REFERENCE TO RELATED APPLICATION

This application is a Divisional of U.S. application Ser. No. 14/533,070, filed Nov. 4, 2014, now U.S. Pat. No. 9,909,240 which issued on Mar. 6, 2018, the disclosure of which is incorporated by reference herein in its entirety.

BACKGROUND

Technical Field

This technology relates to processes for preparing ultra-high molecular weight polyethylene ("UHMW PE") yarns, and the yarns and articles produced therefrom.

Description of the Related Art

Ballistic resistant articles fabricated from composites comprising high strength synthetic fibers are well known. Many types of high strength fibers are known, and each type of fiber has its own unique characteristics and properties. In this regard, one defining characteristic of a fiber is the ability of the fiber to bond with or adhere with surface coatings, such as resin coatings. For example, ultra-high molecular weight polyethylene fibers are naturally inert, while aramid fibers have a high-energy surface containing polar functional groups. Accordingly, resins generally exhibit a stronger affinity for aramid fibers compared to inert UHMW PE fibers. Nevertheless, it is also generally known that synthetic fibers are naturally prone to static build-up and thus typically require the application of a fiber surface finish in order to facilitate further processing into useful composites. Fiber finishes are employed to reduce static build-up, and in the case of untwisted and un-entangled fibers, to aid in maintaining fiber cohesiveness and preventing fiber tangling. Finishes also lubricate the surface of the fiber, protecting the fiber from the equipment and protecting the equipment from the fiber.

The art teaches many types of fiber surface finishes for use in various industries. See, for example, U.S. Pat. Nos. 5,275,625, 5,443,896, 5,478,648, 5,520,705, 5,674,615, 6,365,065, 6,426,142, 6,712,988, 6,770,231, 6,908,579 and 7,021,349, which teach spin finish compositions for spun fibers. However, typical fiber surface finishes are not universally desirable. One notable reason is because a fiber surface finish can interfere with the interfacial adhesion or bonding of polymeric binder materials on fiber surfaces, including aramid fiber surfaces. Strong adhesion of polymeric binder materials is important in the manufacture of ballistic resistant fabrics, especially non-woven composites such as non-woven SPECTRA SHIELD® composites produced by Honeywell International Inc. of Morristown, N.J. Insufficient adhesion of polymeric binder materials on the fiber surfaces may reduce fiber-fiber bond strength and fiber-binder bond strength and thereby cause united fibers to disengage from each other and/or cause the binder to delaminate from the fiber surfaces. A similar adherence problem is also recognized when attempting to apply protective polymeric compositions onto woven fabrics. This detrimentally affects the ballistic resistance properties (anti-ballistic performance) of such composites and can result in catastrophic product failure.

It is known from co-pending U.S. application Ser. Nos. 13/594,715; 13/594,735; 13/594,747; 13/594,757; 13/594,763; 13/602,371 and 13/602,381, each of which is incorporated by reference herein, that the bond strength of an applied material on a fiber is improved when it is bonded directly with the fiber surfaces rather than being applied on top of a fiber finish. Such direct application is enabled by at least partially removing the pre-existing fiber surface finish from the fibers prior to applying the material, such as a polymeric binder material, onto the fibers and prior to uniting the fibers as fiber layers or fabrics.

It is also known from the above co-pending applications that the fiber surfaces may be treated with various surface treatments, such as a plasma treatment or a corona treatment, to enhance the surface energy at the fiber surfaces and thereby enhance the ability of a material to bond to the fiber surface. The surface treatments are particularly effective when performed directly on exposed fiber surfaces rather than on top of a fiber finish. The combined finish removal and surface treatment reduces the tendency of the fibers to delaminate from each other and/or delaminate from fiber surface coatings when employed within a ballistic resistant composite. However, the effects of such surface treatments are known to have a shelf life. Over time, the added surface energy decays and the treated surface eventually returns to its original dyne level. This decay of the treatment is particularly significant when treated fibers are not immediately fabricated into composites, but rather are stored for future use. Therefore, there is a need in the art for a method of preserving the surface treatment, thereby increasing the shelf life of the treated fibers and allowing them to be effectively used in a discontinuous fabric/composite fabrication process rather than requiring immediate fabrication into fabrics/composites in a continuous process.

As described in commonly-owned, co-pending U.S. application Ser. Nos. 13/795,167 and 13/795,278, which are incorporated herein by reference, the surface treatment may be successfully preserved by applying a protective coating onto the treated fibers soon or immediately after treatment. This allows the treated and protected fibers to be wound and stored for future fabrication into composite materials as desired. U.S. application Ser. Nos. 13/795,167 and 13/795,278 teach various protective coating types that effectively preserve the enhanced fiber surface energy resulting from the treatment. However, it has been found that not all protective coating types achieve equivalent results. Some protective coating types, for example, may cause fiber clumping in later processing, interfering with fiber spreading during fabric/composite formation. In said case, better results are actually achieved in a continuous fabrication process rather than a discontinuous process. A new class of coatings materials has now been found that does not exhibit such undesirable fiber clumping, thereby improving fiber spreading during the discontinuous fabrication of fabrics/composites. As such, fabrics/composites, particularly unidirectional fabrics or composites are formed having greater fiber spreading and uniformity across the width of the fiber array or fiber ply with a minimum of gaps between adjacent fibers. Composite materials fabricated with this new class of protective coating materials are indistinguishable from comparative composite materials produced in a continuous inline process wherein the fibers are immediately fabricated into fabrics/composites with or without the application of a protective coating.

SUMMARY

Provided is a process comprising:

a) providing one or more fibers having at least some exposed fiber surface areas that are at least partially free of a fiber surface finish;

b) treating the exposed fiber surface areas under conditions effective to enhance the surface energy of the fiber surface areas; and c) applying a protective coating onto at least a portion of the treated fiber surface areas to thereby form coated, treated fibers, said protective coating comprising at least one poly (alkyl-oxide) polymer.

Also provided is a process comprising:

a) providing one or more partially oriented fibers, each of said one or more partially oriented fibers having at least some exposed fiber surface areas that are at least partially free of a fiber surface finish;

b) treating the exposed fiber surface areas under conditions effective to enhance the surface energy of the fiber surface areas;

c) applying a protective coating onto at least a portion of the treated fiber surface areas to thereby form coated, treated fibers, said protective coating comprising at least one poly (alkyl-oxide) polymer; and d) passing the coated, treated fibers through one or more dryers to dry the coating on the coated, treated fibers while simultaneously stretching the coated, treated fibers as they travel through the one or more dryers, thereby forming highly oriented fibers having a tenacity of greater than 27 g/denier.

Also provided are fibers and fibrous composites produced from said processes.

DETAILED DESCRIPTION

Figure 1:
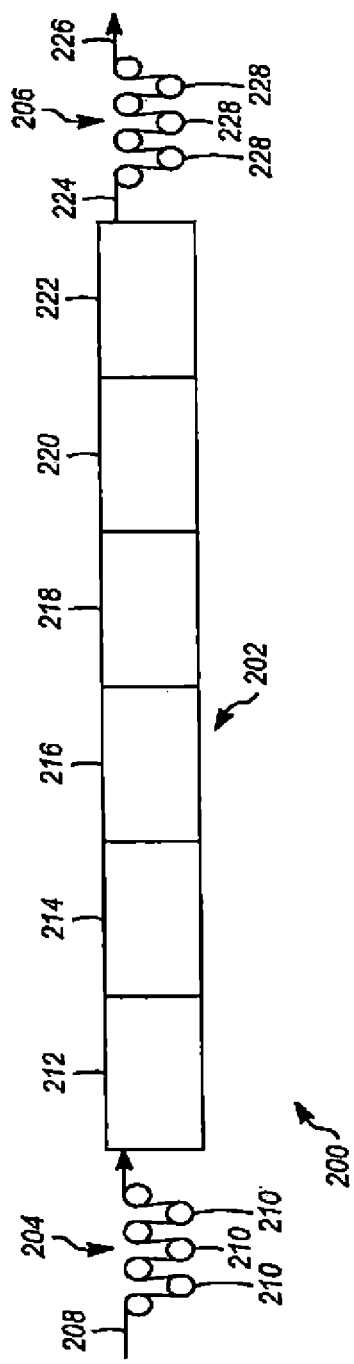
FIG. 1 illustrates an example of a post-draw process utilizing a heating apparatus incorporating a series of horizontally arranged ovens with draw rolls external to the ovens.

A process is provided for treating fibers on exposed surfaces or surface areas to enhance the surface energy at the fiber surface/surface areas, which treatment is then locked in or protected by a protective coating applied onto the treated surfaces/surface areas. The fibers as provided for treatment may be provided as highly oriented, high strength fibers or partially oriented fibers which are subsequently drawn to produce highly oriented fibers.

As used herein, "highly oriented" fibers, alternatively referred to as highly oriented yarns, are fibers (or yarns) that have been subjected to one or more drawing steps which have resulted in the fabrication of fibers having a tenacity of greater than 27 g/denier. Desirable processes for producing drawn fibers, including highly oriented fibers, are described in commonly-owned U.S. Pat. Nos. 6,969,553; 7,344,668; 7,370,395; 7,846,363; 8,361,366 and 8,747,715 and U.S. application Ser. No. 13/173,919 (U.S. pre-grant publication 2011/0269359), each of which is incorporated herein by reference to the extent consistent herewith. As used herein, "partially oriented" fibers, alternatively referred to as partially oriented yarns, are fibers (or yarns) that have been subjected to one or more drawing steps which have resulted in the fabrication of fibers having a tenacity of at least about 18 g/denier up to 27 g/denier.

As described in the above referenced patents and publication, a highly oriented fiber (yarn) is typically produced from a gel spinning process and is distinguished from a "partially oriented" fiber (alternatively "partially oriented yarn") in that a highly oriented fiber has been subjected to a post-drawing operation to thereby increase its fiber tenacity. Accordingly a highly oriented yarn/fiber has higher tenacity than a partially oriented yarn/fiber. For example, the above cited patents and publication describe post-drawing operations that are conducted on partially oriented yarns/fibers to form highly oriented yarns/fibers. In accordance with the present processes, all fiber stretching steps are preferably completed before the fibers are coated with a protective coating.

As used herein, the term "tenacity" refers to the tensile stress expressed as force (grams) per unit linear density (denier) of an unstressed specimen and is measured by ASTM D2256. The "initial modulus" of a fiber is the property of a material representative of its resistance to deformation. The term "tensile modulus" refers to the ratio of the change in tenacity, expressed in grams-force per denier (g/d) to the change in strain, expressed as a fraction of the original fiber length (in/in).

In accordance with the present processes, the fibers that are to be treated with a treatment that enhances surface energy (such as plasma treatment or corona treatment) are treated at least on naked fiber surfaces/surface areas, i.e. surfaces/surface areas that include no fiber surface finish such as a spin finish. In this regard, the fibers as provided may have never had a fiber surface finish on their surfaces, or if a fiber surface finish is present on the fibers as provided, the fibers are first washed prior to plasma treatment, corona treatment, etc., to remove at least a portion of the existing fiber surface finish from the fiber surfaces to at least partially expose the underlying fiber surfaces. This permits the plasma treatment, corona treatment, etc., to be conducted directly on the exposed fiber surfaces under conditions effective to enhance the surface energy of the fiber surfaces. After treating, the treated fibers are coated with the protective coating. If the fibers as provided are partially oriented yarns/fibers, the coated, treated fibers are preferably subjected to a post-drawing operation where the fibers are drawn concurrently with the drying of the protective coating to form a highly oriented yarn/fiber.

As used herein, a "fiber" is an elongate body the length dimension of which is much greater than the transverse dimensions of width and thickness. A fiber as used herein is preferably a continuous elongate body, rather than a short, discontinuous "staple fiber." The cross-sections of fibers for use in this invention may vary widely, and they may be circular, flat or oblong in cross-section. Thus the term "fiber" includes filaments, ribbons, strips and the like having regular or irregular cross-section, but it is preferred that the fibers have a substantially circular cross-section. As used herein, the term "yarn" is defined as a single strand consisting of multiple filaments. A single fiber may be formed from just one filament or from multiple filaments. A fiber formed from just one filament is referred to herein as either a "single-filament" fiber or a "monofilament" fiber, and a fiber formed from a plurality of filaments is referred to herein as a "multifilament" fiber and is often also referred to as a yarn.

A fiber surface finish is typically applied to all fibers to facilitate their processability. To permit direct plasma or corona treatment of the fiber surfaces, it is necessary that existing fiber surface finishes be at least partially removed from the fiber surfaces, and preferably substantially completely removed from all or some of the fiber surfaces of some or all of the component fibers that will form a fibrous composite. This removal of the fiber finish will also serve to enhance fiber-fiber friction and to permit direct bonding of resins or polymeric binder materials to the fiber surfaces, thereby increasing the fiber-coating bond strength.

The step of washing the fibers or otherwise removing the fiber finish will remove enough of the fiber finish so that at least some underlying fiber surface areas are exposed, although different removal conditions should be expected to remove different amounts of the finish. For example, factors such as the composition of the washing agent (e.g. water), mechanical attributes of the washing technique (e.g. the force of the water contacting the fiber; agitation of a washing bath, etc.), will affect the amount of finish that is removed. For the purposes herein, minimal processing to achieve minimal removal of the fiber finish will generally expose at least 10% of the fiber surface area. Preferably, the fiber surface finish is removed such that the fibers are predominantly free of a fiber surface finish. As used herein, fibers that are "predominantly free" of a fiber surface finish are fibers which have had at least 50% by weight of their finish removed, more preferably at least about 75% by weight of their finish removed. It is even more preferred that the fibers are substantially free of a fiber surface finish. Fibers that are "substantially free" of a fiber finish are fibers which have had at least about 90% by weight of their finish removed, and most preferably at least about 95% by weight of their finish removed, thereby exposing at least about 90% or at least about 95% of the fiber surface area that was previously covered by the fiber surface finish. Most preferably, any residual finish will be present in an amount of less than or equal to about 0.5% by weight based on the weight of the fiber plus the weight of the finish, preferably less than or equal to about 0.4% by weight, more preferably less than or equal to about 0.3% by weight, more preferably less than or equal to about 0.2% by weight and most preferably less than or equal to about 0.1% by weight based on the weight of the fiber plus the weight of the finish. When a residual finish is present, a two-layer coating is therefore present in areas where the protective coating is applied on top of the residual finish, which will become a three-layer coating if a matrix/binder composition is thereafter applied.

A fiber that is predominantly free of a fiber surface finish may still have a portion of its surface area covered by residual patches of finish rather than a continuous coating. Accordingly, a fiber having surfaces that are predominantly free of a fiber surface finish has its surface at least partially exposed and not covered by a fiber finish, where preferably less than 50% of the fiber surface area is covered by a fiber surface finish. Where removal of the fiber finish has resulted in less than 50% of the fiber surface area being covered by a fiber surface finish, the protective coating material will thereby be in direct contact with greater than 50% of the fiber surface area.

It is most preferred that the fiber surface finish is substantially completely removed from the fibers and the fiber surfaces are substantially completely exposed. In this regard, a substantially complete removal of the fiber surface finish is the removal of at least about 95%, more preferably at least about 97.5% and most preferably at least about 99.0% removal of the fiber surface finish, and whereby the fiber surface is at least about 95% exposed, more preferably at least about 97.5% exposed and most preferably at least about 99.0% exposed. Ideally, 100% of the fiber surface finish is removed, thereby exposing 100% of the fiber surface area. Following removal of the fiber surface finish, it is also preferred that the fibers are cleared of any removed finish particles prior to application of a polymeric binder material, resin or other adsorbate onto the exposed fiber surfaces. As processing of the fibers to achieve minimal removal of the fiber finish will generally expose at least about 10% of the fiber surface area, a comparable fiber which has not been similarly washed or treated to remove at least a portion of the fiber finish will have less than 10% of the fiber surface area exposed, with zero percent surface exposure or substantially no fiber surface exposure.

Any conventionally known method for removing fiber surface finishes is useful within the context of the present invention, including both mechanical and chemical techniques means. The necessary method is generally dependent on the composition of the finish. For example, in the preferred embodiment of the invention, the fibers are coated with a finish that is capable of being washed off with only water. Typically, a fiber finish will comprise a combination of one or more lubricants, one or more non-ionic emulsifiers (surfactants), one or more anti-static agents, one or more wetting and cohesive agents, and one or more antimicrobial compounds. The finish formulations preferred herein can be washed off with only water. Mechanical means may also be employed together with a chemical agent to improve the efficiency of the chemical removal. For example, the efficiency of finish removal using de-ionized water may be enhanced by manipulating the force, direction velocity, etc. of the water application process.

Most preferably, the fibers are washed and/or rinsed with water, preferably using de-ionized water, with optional drying of the fibers after washing, without using any other chemicals. In other embodiments where the finish is not water soluble, the finish may be removed or washed off with, for example, an abrasive cleaner, chemical cleaner or enzyme cleaner. For example, U.S. Pat. Nos. 5,573,850 and 5,601,775, which are incorporated herein by reference, teach passing yarns through a bath containing a non-ionic surfactant (HOSTAPUR® CX, commercially available from Clamant Corporation of Charlotte, N.C.), trisodium phosphate and sodium hydroxide, followed by rinsing the fibers. Other useful chemical agents non-exclusively include alcohols, such as methanol, ethanol and 2-propanol; aliphatic and aromatic hydrocarbons such as cyclohexane and toluene; chlorinated solvents such as di-chloromethane and tri-chloromethane. Washing the fibers will also remove any other surface contaminants, allowing for more intimate contact between the fiber and resin or other coating material.

The preferred means used to clean the fibers with water is not intended to be limiting except for the ability to substantially remove the fiber surface finish from the fibers. In a preferred method, removal of the finish is accomplished by a process that comprises passing a web or continuous array of generally parallel fibers through pressurized water nozzles to wash (or rinse) and/or physically remove the finish from the fibers. The fibers may optionally be pre-soaked in a water bath before passing the fibers through said pressurized water nozzles, and/or soaked after passing the fibers through the pressurized water nozzles, and may also optionally be rinsed after any of said optional soaking steps by passing the fibers through additional pressurized water nozzles. The washed/soaked/rinsed fibers are preferably also dried after washing/soaking/rinsing is completed. The equipment and means used for washing the fibers is not intended to be limiting, except that it must be capable of washing individual multifilament fibers/multifilament yarns rather than fabrics, i.e. before they are woven or formed into non-woven fiber layers or plies.

After the fiber surface finish is removed to the desired degree (and dried, if necessary), the fibers are subjected to a treatment that is effective to enhance the surface energy of the fiber surfaces. Useful treatments non-exclusively include corona treatment, plasma treatment, ozone treatment, acid etching, ultraviolet (UV) light treatment or any other treatment that is capable of aging or decaying over time. It has also been recognized that applying a protective coating onto fibers after removal of the fiber surface finish is beneficial to fibers even if they have not been subsequently treated or if the exposed fiber surfaces are treated with a treatment that does not alter fiber surface energy. This is because it is generally known that synthetic fibers are naturally prone to static build-up and need some form of lubrication to maintain fiber cohesiveness. The protective coating provides sufficient lubrication to the surface of the fiber, thereby protecting the fiber from the equipment and protecting the equipment from the fiber. It also reduces static build-up and facilitates further processing into useful composites. Accordingly, fiber surface treatments that do not alter fiber surface energy and have no risk of treatment decay are also within the scope of the invention, as the protective coating has numerous benefits.

When the fibers are treated as intended to enhance their surface energy at exposed surface areas, and the most preferred treatments are plasma treatment and corona treatment. Both a plasma treatment and a corona treatment will modify the fibers at the fiber surfaces, thereby enhancing the bonding of a subsequently applied protective coating onto the fiber surfaces. As noted previously, removal of the fiber finish allows these additional processes to act directly on the surface of the fiber and not on the fiber surface finish or on surface contaminants. Plasma treatment and corona treatment are each particularly desirable for optimizing the interaction between the bulk fiber and fiber surface coatings to improve the anchorage of the protective coating and later applied polymeric/resinous binder (polymeric/resinous matrix) coatings to the fiber surfaces.

Corona treatment is a process in which fibers, typically in a web or in a continuous array of fibers, are passed through a corona discharge station, thereby passing the fibers through a series of high voltage electric discharges that enhance the surface energy of the fiber surfaces/surface areas, such as by transferring kinetic energy to the surfaces/surface areas. In addition to enhancing the surface energy of the fiber surfaces/surface areas, a corona treatment may also pit and roughen the fiber surface, such as by burning small pits or holes into the surface of a fiber, and may also introduce polar functional groups to the surface by way of partially oxidizing the surface of the fiber. When the corona treated fibers are oxidizable, the extent of oxidation is dependent on factors such as power, voltage and frequency of the corona treatment. Residence time within the corona discharge field is also a factor, and this can be manipulated by corona treater design or by the line speed of the process. Suitable corona treatment units are available, for example, from Enercon Industries Corp., Menomonee Falls, Wis., from Sherman Treaters Ltd, Thame, Oxon., UK, or from Softal Corona & Plasma GmbH & Co of Hamburg, Germany.

In a preferred embodiment, the fibers are subjected to a corona treatment of from about 2 Watts/ft$^2$/min to about 100 Watts/ft$^2$/min, more preferably from about 5 Watts/ft$^2$/min to about 50 Watts/ft$^2$/min, and most preferably from about 20 Watts/ft$^2$/min to about 50 Watts/ft$^2$/min. Lower energy corona treatments from about 1 Watts/ft$^2$/min to about 5 Watts/ft$^2$/min are also useful but may be less effective.

In a plasma treatment, fibers are passed through an ionized atmosphere in a chamber that is filled with an inert or non-inert gas, such as oxygen, argon, helium, ammonia, or another appropriate inert or non-inert gas, including combinations of the above gases, to thereby contact the fibers with a combination of neutral molecules, ions, free radicals, as well as ultraviolet light. At the fiber surfaces, collisions of the surfaces with charged particles (ions) result in both the transfer of kinetic energy and the exchange of electrons, etc., thereby enhancing the surface energy of the fiber surfaces. Collisions between the surfaces and free radicals will result in similar chemical rearrangements. Chemical changes to the fiber substrate are also caused by bombardment of the fiber surface by ultraviolet light which is emitted by excited atoms, and by molecules relaxing to lower states. As a result of these interactions, the plasma treatment may modify both the chemical structure of the fiber as well as the topography of the fiber surfaces. For example, like corona treatment, a plasma treatment may also add polarity to the fiber surface and/or oxidize fiber surface moieties. Plasma treatment may also serve to reduce the contact angle of the fiber, increase the crosslink density of the fiber surface thereby increasing hardness, melting point and the mass anchorage of subsequent coatings, and may add a chemical functionality to the fiber surface and potentially ablate the fiber surface. These effects are likewise dependent on the fiber chemistry, and are also dependent on the type of plasma employed.

The selection of gas is important for the desired surface treatment because the chemical structure of the surface is modified differently using different plasma gases. Such would be determined by one skilled in the art. It is known, for example, that amine functionalities may be introduced to a fiber surface using ammonia plasma, while carboxyl and hydroxyl groups may be introduced by using oxygen plasma. Accordingly, the reactive atmosphere may comprise one or more of argon, helium, oxygen, nitrogen, ammonia, and/or other gas known to be suitable for plasma treating of fabrics. The reactive atmosphere may comprise one or more of these gases in atomic, ionic, molecular or free radical form. For example, in a preferred continuous process of the invention, a web or a continuous array of fibers is passed through a controlled reactive atmosphere that preferably comprises argon atoms, oxygen molecules, argon ions, oxygen ions, oxygen free radicals, as well as other trace species.

In a preferred embodiment, the reactive atmosphere comprises both argon and oxygen at concentrations of from about 90% to about 95% argon and from about 5% to about 10% oxygen, with 90/10 or 95/5 concentrations of argon/oxygen being preferred. In another preferred embodiment, the reactive atmosphere comprises both helium and oxygen at concentrations of from about 90% to about 95% helium and from about 5% to about 10% oxygen, with 90/10 or 95/5 concentrations of helium/oxygen being preferred. Another useful reactive atmosphere is a zero gas atmosphere, i.e. room air comprising about 79% nitrogen, about 20% oxygen and small amounts of other gases, which is also useful for corona treatment to some extent.

A plasma treatment differs from a corona treatment mainly in that a plasma treatment is conducted in a controlled, reactive atmosphere of gases, whereas in corona treatment the reactive atmosphere is air. The atmosphere in the plasma treater can be easily controlled and maintained, allowing surface polarity to be achieved in a more controllable and flexible manner than corona treating. The electric discharge is by radio frequency (RF) energy which dissociates the gas into electrons, ions, free radicals and metastable products. Electrons and free radicals created in the plasma collide with the fiber surface, rupturing covalent bonds and creating free radicals on the fiber surface. In a batch process, after a predetermined reaction time or temperature, the process gas and RF energy are turned off and the leftover gases and other byproducts are removed. In a continuous process, which is preferred herein, a web or a continuous array of fibers is passed through a controlled reactive atmosphere comprising atoms, molecules, ions and/or free radicals of the selected reactive gases, as well as other trace species. The reactive atmosphere is constantly generated and replenished, likely reaching a steady state composition, and is not turned off or quenched until the plasma machine is stopped.

Plasma treatment may be carried out using any useful commercially available plasma treating machine, such as plasma treating machines available from Softal Corona & Plasma GmbH & Co of Hamburg, Germany; 4$^{th}$ State, Inc of Belmont Calif.; Plasmatreat US LP of Elgin, Ill.; Enercon Surface Treating Systems of Milwaukee, Wis. Plasma treating may be conducted in a chamber maintained under a vacuum or in a chamber maintained at atmospheric conditions. When atmospheric systems are used, a fully closed chamber is not mandatory. Plasma treating or corona treating the fibers in a non-vacuum environment, i.e. in a chamber that is not maintained at either a full or partial vacuum, may increase the potential for fiber degradation. This is because the concentration of the reactive species is proportional to the treatment pressure. This increased potential for fiber degradation may be countered by reducing the residence time in the treatment chamber. Treating fibers under a vacuum results in the need for long treatment residence times. This undesirably causes a typical loss of fiber strength properties, such as fiber tenacity, of approximately 15% to 20%. The aggressiveness of the treatments may be reduced by reducing energy flux of the treatment, but this sacrifices the effectiveness of the treatments in enhancing bonding of coatings on the fibers. However, when conducting the fiber treatments after at least partially removing the fiber finish, fiber tenacity loss is less than 5%, typically less than 2% or less than 1%, often no loss at all, and in some instances fiber strength properties actually increase, which is due to increased crosslink density of the polymeric fiber due to the direct treatment of the fiber surfaces. When conducting the fiber treatments after at least partially removing the fiber finish, the treatments are much more effective and may be conducted in less aggressive, non-vacuum environments at various levels of energy flux without sacrificing coating bond enhancement. In the most preferred embodiments of the invention, the high tenacity fibers are subjected to a plasma treatment or to a corona treatment in a chamber maintained at about atmospheric pressure or above atmospheric pressure. As a secondary benefit, plasma treatment under atmospheric pressure allows the treatment of more than one fiber at a time, whereas treatment under a vacuum is limited to the treatment of one fiber at a time.

A preferred plasma treating process is conducted at about atmospheric pressure, i.e. 1 atm (760 mm Hg (760 torr)), with a chamber temperature of about room temperature (70° F.-72° F.). The temperature inside the plasma chamber may potentially change due to the treating process, but the temperature is generally not independently cooled or heated during treatments, and it is not believed to affect the treatment of the fibers as they rapidly pass through the plasma treater. The temperature between the plasma electrodes and the fiber web is typically approximately 100° C. The plasma treating process is conducted within a plasma treater that preferably has a controllable RF power setting. Useful RF power settings are generally dependent on the dimensions of the plasma treater and therefore will vary. The power from the plasma treater is distributed over the width of the plasma treating zone (or the length of the electrodes) and this power is also distributed over the length of the substrate or fiber web at a rate that is inversely proportional to the line speed at which the fiber web passes through the reactive atmosphere of the plasma treater. This energy per unit area per unit time (watts per square foot per minute or W/ft$^2$/min) or energy flux, is a useful way to compare treatment levels. Effective values for energy flux are preferably from about 0.5 W/ft$^2$/min to about 200 W/ft$^2$/min, more preferably from about 1 W/ft$^2$/min to about 100 W/ft$^2$/min, even more preferably from about 1 W/ft$^2$/min to about 80 W/ft$^2$/min, even more preferably from about 2 W/ft$^2$/min to about 40 W/ft$^2$/min, and most preferably from about 2 W/ft$^2$/min to about 20 W/ft$^2$/min.

As an example, when utilizing a plasma treater having a relatively narrow treating zone of 30-inches (76.2 cm) set at atmospheric pressure, the plasma treating process is preferably conducted at an RF power setting of from about 0.5 kW to about 3.5 kW, more preferably from about 1.0 kW to about 3.05 kW, and most preferably is conducted with RF power set at 2.0 kW. The total gas flow rate for a plasma treater of this size is preferably approximately 16 liters/min, but this is not intended to be strictly limiting. Larger plasma treating units are capable of higher RF power settings, such as 10 kW, 12 kW or even greater, and at higher gas flow rates relative to smaller plasma treaters.

As the total gas flow rate is distributed over the width of the plasma treating zone, additional gas flow may be necessary with increases to the length/width of the plasma treating zone of the plasma treater. For example, a plasma treater having a treating zone width of 2× may need twice as much gas flow compared to a plasma treater having a treating zone width of 1×. The plasma treatment time (or residence time) of the fiber is also is relative to the dimensions of the plasma treater employed and is not intended to be strictly limiting. In a preferred atmospheric system, the fibers are exposed to the plasma treatment with a residence time of from about ½ second to about three seconds, with an average residence time of approximately 2 seconds. A more appropriate measure of this exposure is the amount of plasma treatment in terms of RF power applied to the fiber per unit area over time, also called the energy flux.

Following the treatment that enhances the surface energy of the fiber surfaces, the protective coating is applied onto at least a portion of the treated fiber surfaces to thereby form coated, treated fibers. Coating the treated fiber surfaces immediately after the surface treatment is most preferred because it will cause the least disruption to the fiber manufacturing process and will leave the fiber in a modified and unprotected state for the shortest period of time. More importantly, because it is known that surface energy enhancing treatments decay or age over time and the fibers eventually return to their untreated, original surface energy level, applying a polymer or resin coating onto the treated fibers after the surface treatment has been found effective to preserve the enhanced energy level resulting from the fiber treatments. Most preferably, the protective coating is applied onto at least a portion of the treated fiber surfaces immediately after the treatment that enhances the surface energy of the fiber surfaces to leave the fibers in a treated and uncoated state for the shortest length of time to minimize surface energy decay.

The protective coating is applied to individual fibers, not to fabric layers or fiber plies, and is applied in small quantities, i.e. less than about 5% by weight based on the weight of the fiber plus the weight of the protective coating. More preferably, the protective coating comprises about 3% by weight or less based on the weight of the fiber plus the weight of the protective coating, still more preferably about 2.5% by weight or less, still more preferably about 2.0% by weight or less, still more preferably about 1.5% by weight or less, and most preferably the protective coating comprises about 1.0% by weight or less based on the weight of the fiber plus the weight of the protective coating. The protective coating preferably comprises at least about 0.2% by weight, more preferably at least about 0.5% by weight based on the weight of the fiber plus the weight of the protective coating.

A protective coating useful herein will comprise, consist essentially of or consist of at least one poly(alkyl-oxide) polymer, or will be a composition comprising or consisting essentially of at least one poly(alkyl-oxide) polymer. It has been found that a most effective protective coating will not have a high affinity for functional groups created on the fiber surface by the plasma treatment or corona treatment, etc. Functional groups present in a coating material that have a high affinity for or would react with the functional groups may effectively neutralize functional groups on the activated fiber surface, thereby reducing the effectiveness of the treatment. For example, a plasma/corona treatment will typically create polar functional groups, such as hydroxyl- (—OH), carboxyl- (—COOH) and carbonyl- (═CO) groups, on the exposed fiber surfaces/surface areas. Said generated functional groups will depend at least in part on the type of gases used in the treatment. Coatings having components that react with such functional groups created on the fiber surface will interfere with the groups created by the treatment and reduce its effectiveness. Accordingly, coating materials having only a low number of such functional groups or none at all are preferred.

In this regard, poly(alkyl-oxide) polymers having only one or two —OH groups per molecule, or poly(alkyl-oxide) polymers with only one or two functional groups per, approximately, every 1200 Daltons are most preferred. Suitable coatings non-exclusively include at least one ethylene oxide homopolymer, at least one propylene oxide homopolymer, at least one ethylene oxide-propylene oxide (EO/PO) copolymer, a polyalkylene oxide such as polytetramethylene oxide, a polyalkylene glycol such as polypropylene glycol, a poly(alkylene ether) glycol such as poly(tetramethylene ether) glycol, or analogs thereof or combinations thereof. Most preferably, the coating consists of or comprises a polymer having relatively low surface tension, i.e. less than 45 mN/m (millinewton per meter), more preferably less than 33 mN/m, and most preferably less than 30 mN/m. In the most preferred embodiments, the coatings comprise, consist essentially of or consist of at least one ethylene oxide-propylene oxide copolymer. Suitable coating materials are commercially available. Suitable coating materials include those described, for example, in U.S. Pat. Nos. 6,365,065; 6,426,142; 6,712,988; 6,770,231; 6,908,579; and 7,021,349, each of which is incorporated by reference herein to the extent consistent herewith.

Ethylene oxide-propylene oxide is a random block copolymer made from ethylene oxide and propylene oxide components. In one embodiment, the ethylene oxide-propylene oxide copolymer has an ethylene oxide:propylene oxide weight ratio of from about 30:70 to about 70:30, more preferably from about 40:60 to about 60:40 or evenly 50:50. The ethylene oxide-propylene oxide copolymer preferably has a weight average molecular weight ranging from about 500 g/mol to about 10000 g/mol, more preferably from about 500 g/mol to about 7500 g/mol and most preferably from about 500 g/mol to about 6000 g/mol. Ethylene oxide and propylene oxide may be reacted with an alcohol to form mixed polyalkylene glycol compounds with at least one alcohol end group having one to four carbon atoms. Useful EO/PO copolymers and polyalkylene glycol compounds are commercially available.

The coating may comprise, consist essentially of or consist of solely an ethylene oxide-propylene oxide copolymer or may comprise, consist essentially of or consist of a composition additionally including other components. Other components non-exclusively include one or more lubricants, one or more non-ionic emulsifiers (surfactants), one or more anti-static agents, one or more wetting and cohesive agents, and one or more antimicrobial compounds, etc. Preferably, the poly(alkyl-oxide) polymer comprises at least 50 percent by weight of the coating composition, more preferably at least about 60 percent by weight of the coating composition, still more preferably at least about 70 percent by weight of the coating composition, still more preferably at least about 80 percent by weight of the coating composition, and most preferably comprises, consists essentially of or consists of at least about 90 percent by weight of the coating composition up to 100% of the protective coating being a poly(alkyl-oxide) polymer. Most preferably, the protective coating on the fibers comprises, consists essentially of or consists of at least about 70% by weight of an ethylene oxide-polypropylene oxide copolymer, preferably greater than 70% by weight of an ethylene oxide-polypropylene oxide copolymer, still more preferably at least about 80% by weight of the coating composition, still more preferably at least about 90% by weight of the coating composition, up to 100% of the protective coating composition.

It has been found that the poly(alkyl-oxide) polymers used in the protective coatings are particularly compatible with compositions conventionally used as polymeric binder/matrix materials in the art of ballistic resistant composites, including polyurethanes. The poly(alkyl oxide) type of protective coating beneficially permits greater uniformity during fiber spreading and does not hinder the ability of the treated fiber to be spread into a uniform fiber web. Particularly, the poly(alkyl oxide) type of protective coating inhibits fiber clumping and the formation of gaps between adjacent fibers upon yarn/fiber spreading during the fabrication of unidirectional yarn/fiber composites.

Figure 3A:
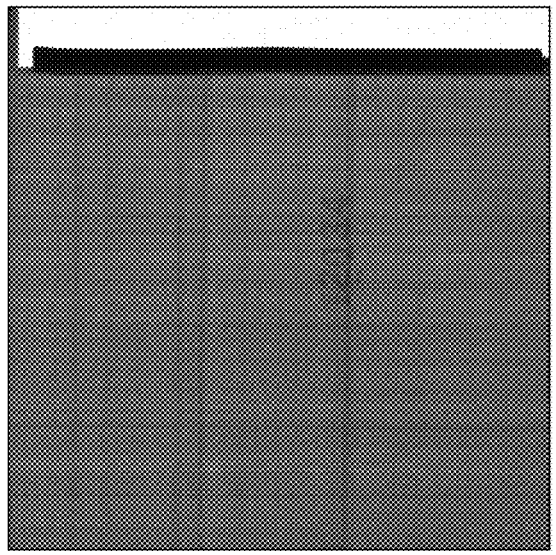
FIG. 3(a) is a scanned image of a 2-ply (0°/90°) non-woven composite that has been plasma treated and coated with an ethylene oxide-polypropylene oxide random copolymer protective coating, which image shows now gaps between fibers or fiber clumping.
Figure 3B:
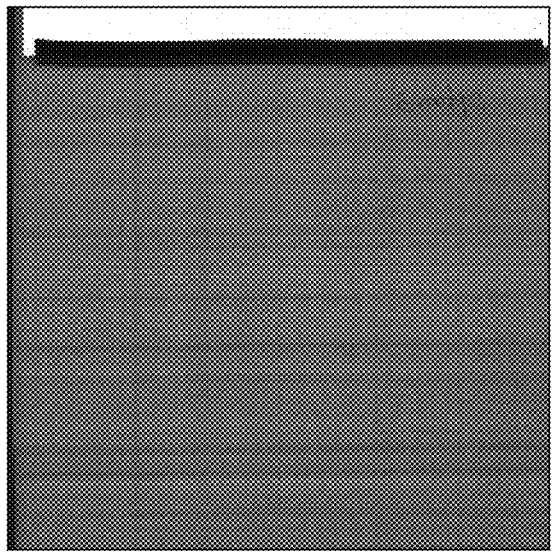
FIG. 3(b) is a scanned image of the reverse surface of the 2-ply (0°/90°) non-woven composite shown in FIG. 3(a).
Figure 5:
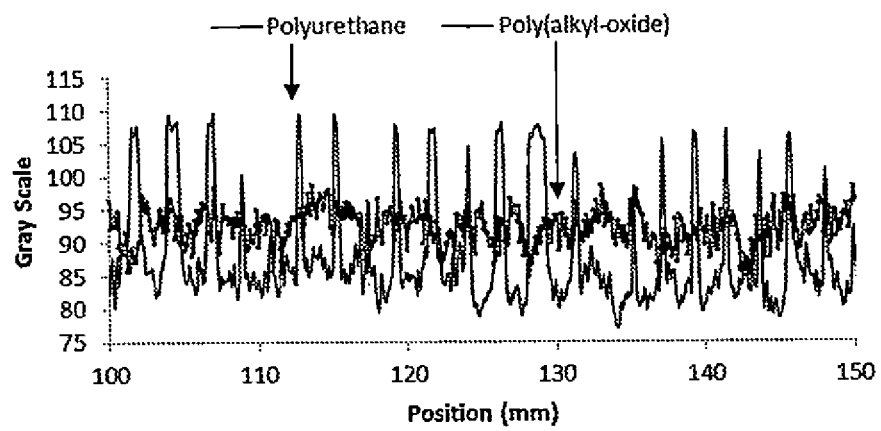
FIG. 5 is a graphical representation of the gray scale analysis of the scanned images of FIGS. 3(a) and 4(a).
Figure 6:
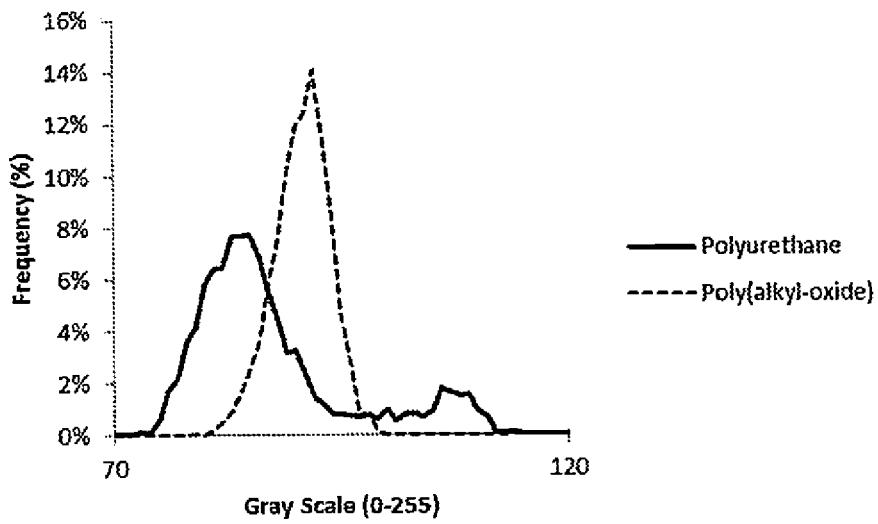
FIG. 6 is a graphical representation of the gray scale analysis of the scanned images of FIGS. 3(a) and 4(a).
Figure 7:
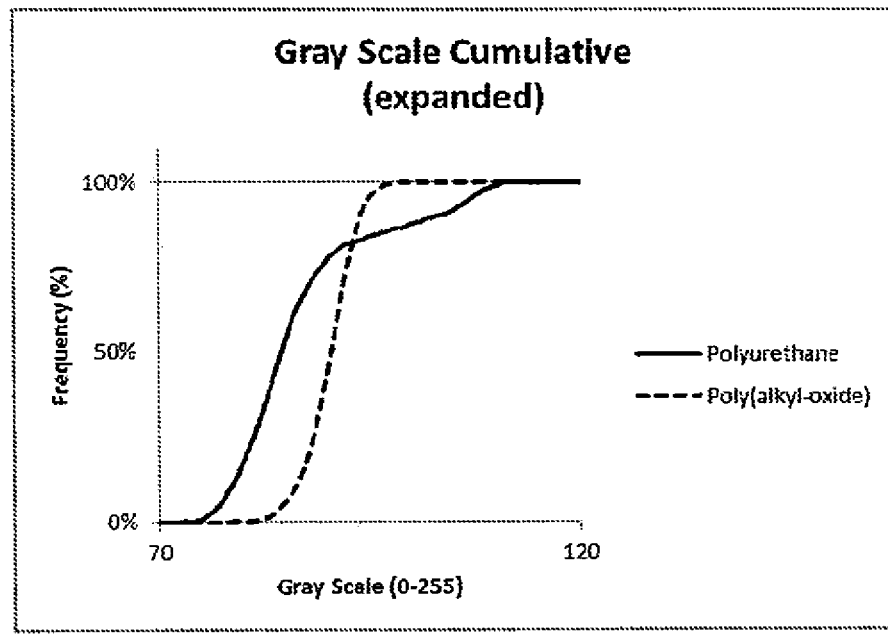
FIG. 7 is a graphical representation of the gray scale analysis of the scanned images of FIGS. 3(a) and 4(a).
Figure 8:
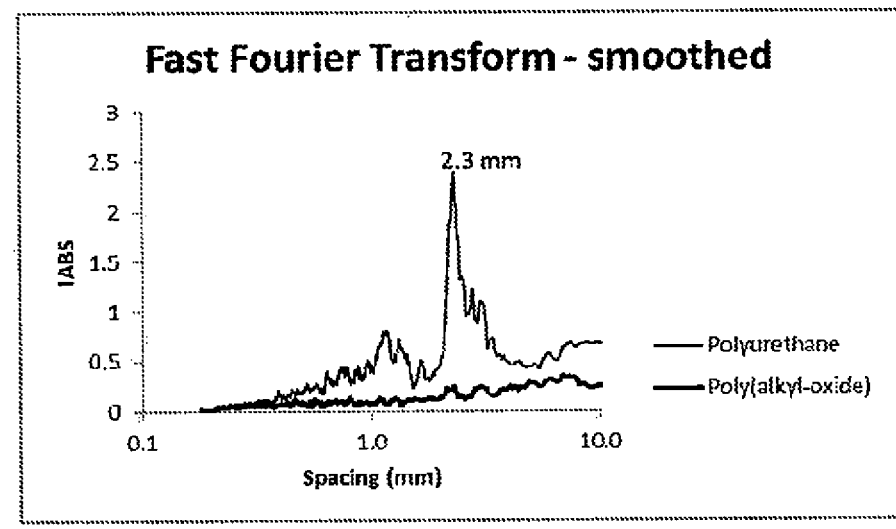
FIG. 8 is a graphical representation of the Fast Fourier Transform spectral amplitude of the scanned images of FIGS. 3(a) and 4(a).

The absence of gaps and absence of fiber clumps is recognizable by the unaided eye, but may be quantified by gray scale analysis and Fast Fourier Transform (FFT) analysis of scanned images of the formed composites, as illustrated in the examples below and FIGS. 3(a), 3(b), 4(a), 4(b), and 5-8. When images of the formed composites of the invention are subjected to FFT analysis, the FFT spectral amplitude for composites of the invention will exhibit no peaks or no strong, distinct peak in the magnitude of the frequency of the data (i.e. no "peak" in the magnitude of the frequency that is greater than, for example, 0.5, relative to the next highest "peak" in the magnitude of the frequency of the data), as seen in FIG. 8. When images of the formed composites of the invention are subjected to gray scale analysis, the gray scale profile will be relatively uniform relative to prior art composites (such as composites coated with a polyurethane based protective coating) as seen in FIGS. 5-7. Gray scale analysis of the inventive composites, preferably performed on 2-ply, orthogonal (0°/90°) nonwoven composites as shown in FIGS. 3(a)-(b) (and comparative prior art FIGS. 4(a)-(b)), will reveal a more consistent, uniform gray profile relative to prior art composites which show white areas between parallel fibers. These white areas in the scanned images are areas where no fibers were present.

The protective coating is applied directly onto the treated fiber surfaces using any appropriate method that would be readily determined by one skilled in the art and the term "coated" is not intended to limit the method by which it is applied onto the fibers. The method used must at least partially coat each treated fiber with the protective coating, preferably substantially coating or encapsulating each individual fiber thereby covering all or substantially all of the filament/fiber surface area with the protective coating. The protective coating may be applied either simultaneously or sequentially to a single fiber or to a plurality of fibers, where a plurality of fibers may be arranged side-by-side in an array and coated with the protective coating as an array.

Whether the fibers treated herein are partially oriented fibers or highly oriented fibers, such fibers may be produced using conventionally known techniques. For example, in a preferred processes for producing a fiber from ultra high molecular weight polyethylene, a slurry comprising an UHMW PE and a spinning solvent is fed to an extruder to produce a liquid mixture, the liquid mixture is then passed through a heated vessel to form a homogeneous solution comprising the UHMW PE and the spinning solvent; that solution is then provided from the heated vessel to a spinneret to form a solution yarn; the solution yarn that issues from the spinneret is then drawn at a draw ratio of from about 1.1:1 to about 30:1 to form a drawn solution yarn; the drawn solution yarn is then cooled to a temperature below the gel point of the UHMW PE polymer to form a gel yarn; the gel yarn is then drawn one or more times in one or more stages; the spinning solvent is then removed from the gel yarn to form a dry yarn; and the dry yarn is then drawn in at least one stage to form a partially oriented yarn. This process is disclosed in greater detail in commonly-owned U.S. Pat. No. 8,747,715 and U.S. patent application publication 2011/0269359.

The polymers forming the fibers are preferably high-strength, high tensile modulus fibers suitable for the manufacture of ballistic resistant composites/fabrics. Particularly suitable high-strength, high tensile modulus fiber materials that are particularly suitable for the formation of ballistic resistant composites and articles include polyolefin fibers, including high density and low density polyethylene. Particularly preferred are extended chain polyolefin fibers, such as highly oriented, high molecular weight polyethylene fibers, particularly ultra-high molecular weight polyethylene fibers, and polypropylene fibers, particularly ultra-high molecular weight polypropylene fibers. Also suitable are aramid fibers, particularly para-aramid fibers, polyamide fibers, polyethylene terephthalate fibers, polyethylene naphthalate fibers, extended chain polyvinyl alcohol fibers, extended chain polyacrylonitrile fibers, polybenzazole fibers, such as polybenzoxazole (PBO) and polybenzothiazole (PBT) fibers, liquid crystal copolyester fibers and rigid rod fibers such as M5® fibers. Each of these fiber types is conventionally known in the art. Also suitable for producing polymeric fibers are copolymers, block polymers and blends of the above materials.

The most preferred fiber types for ballistic resistant fabrics include polyethylene, particularly extended chain polyethylene fibers, aramid fibers, polybenzazole fibers, liquid crystal copolyester fibers, polypropylene fibers, particularly highly oriented extended chain polypropylene fibers, polyvinyl alcohol fibers, polyacrylonitrile fibers and rigid rod fibers, particularly M5® fibers. Specifically most preferred fibers are polyolefin fibers, particularly polyethylene and polypropylene fiber types.

In the case of polyethylene, preferred fibers are extended chain polyethylenes having molecular weights of at least 500,000, preferably at least one million and more preferably between two million and five million. Such extended chain polyethylene (ECPE) fibers may be grown in solution spinning processes such as described in U.S. Pat. Nos. 4,137,394 or 4,356,138, which are incorporated herein by reference, or may be spun from a solution to form a gel structure, such as described in U.S. Pat. Nos. 4,551,296 and 5,006,390, which are also incorporated herein by reference. A particularly preferred fiber type for use in the invention are polyethylene fibers sold under the trademark SPECTRA® from Honeywell International Inc. SPECTRA® fibers are well known in the art and are described, for example, in U.S. Pat. Nos. 4,413,110; 4,440,711; 4,535,027; 4,457,985; 4,623,547; 4,650,710 and 4,748,064, as well as co-pending application publications 2011/0266710 and 2011/0269359, all of which are incorporated herein by reference to the extent consistent herewith. In addition to polyethylene, another useful polyolefin fiber type is polypropylene (fibers or tapes), such as TEGRIS® fibers commercially available from Milliken & Company of Spartanburg, S.C.

Also particularly preferred are aramid (aromatic polyamide) or para-aramid fibers. Such are commercially available and are described, for example, in U.S. Pat. No. 3,671,542. For example, useful poly(p-phenylene terephthalamide) filaments are produced commercially by DuPont under the trademark of KEVLAR®. Also useful in the practice of this invention are poly(m-phenylene isophthalamide) fibers produced commercially by DuPont under the trademark NOMEX® and fibers produced commercially by Teijin under the trademark TWARON®; aramid fibers produced commercially by Kolon Industries, Inc. of Korea under the trademark HERACRON®; p-aramid fibers SVM™ and RUSAR™ which are produced commercially by Kamensk Volokno JSC of Russia and ARMOS™ p-aramid fibers produced commercially by JSC Chim Volokno of Russia.

Suitable polybenzazole fibers for the practice of this invention are commercially available and are disclosed for example in U.S. Pat. Nos. 5,286,833, 5,296,185, 5,356,584, 5,534,205 and 6,040,050, each of which is incorporated herein by reference. Suitable liquid crystal copolyester fibers for the practice of this invention are commercially available and are disclosed, for example, in U.S. Pat. Nos. 3,975,487; 4,118,372 and 4,161,470, each of which is incorporated herein by reference. Suitable polypropylene fibers include highly oriented extended chain polypropylene (ECPP) fibers as described in U.S. Pat. No. 4,413,110, which is incorporated herein by reference. Suitable polyvinyl alcohol (PV-OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and is widely commercially available.

M5® fibers are formed from pyridobisimidazole-2,6-diyl (2,5-dihydroxy-p-phenylene) and are manufactured by Magellan Systems International of Richmond, Va. and are described, for example, in U.S. Pat. Nos. 5,674,969, 5,939,553, 5,945,537, and 6,040,478, each of which is incorporated herein by reference. Also suitable are combinations of all the above materials, all of which are commercially available. For example, the fibrous layers may be formed from a combination of one or more of aramid fibers, UHMWPE fibers (e.g. SPECTRA® fibers), carbon fibers, etc., as well as fiberglass and other lower-performing materials. The process of the invention nevertheless is primarily suited for polyethylene and polypropylene fibers.

If the fibers that are treated are partially oriented fibers rather than highly oriented fibers, the subsequently coated, treated, partially oriented fibers/yarns are then conveyed to a post drawing apparatus comprising one or more dryers where they are stretched/drawn again for their final conversion into highly oriented fibers/yarns while simultaneously the coating is dried on the fibers. The dryers are preferably forced convection air ovens maintained at a temperature of from about 125° C. to about 160° C. Preferably, the post drawing apparatus comprises a plurality of ovens arranged adjacent to each other in a horizontal series, or arranged vertically on top of each other, or a combination thereof. Other means for drying the coating may also be used, as would be determined by one skilled in the art.

The post drawing operation can, for example, include the conditions described in U.S. Pat. Nos. 6,969,553, 7,344,668 or 7,370,395. One example of a post drawing process is illustrated in FIG. 1. A post drawing apparatus 200 as illustrated includes a heating apparatus 202, a first set of rolls 204 that are external to the heating apparatus 202, and a second set of rolls 206 that are external to the heating apparatus 202. The partially oriented fiber 208 can be fed from a source and passed over the first set of rolls 204. The first set of rolls 204 can be driven rolls, which are operated to rotate at a desired speed to provide the partially oriented fiber 208 to the heating apparatus 202 at a desired feed velocity. The first set of rolls 204 can include a plurality of individual rolls 210. In one example, the first few individual rolls 210 are not heated, and the remaining individual rolls 210 are heated in order to preheat the filaments of the partially oriented fiber 208 before it enters the heating apparatus 202. Although the first set of rolls 204 shown in FIG. 1 includes a total of seven individual rolls 210, the number of individual rolls 210 can be higher or lower, depending upon the desired configuration.

In the embodiment of FIG. 1, the partially oriented fiber 208 is fed into a heating apparatus 202 comprising six adjacent horizontal ovens 212, 214, 216, 218, 220 and 222, although any suitable number of ovens can be utilized, and each oven can each have any suitable length to provide the desired fiber path length. For example, each oven may be from about 10 feet to about 16 feet (3.05 meters to 4.88 meters) long, more preferably from about 11 feet to about 13 feet (3.35 meters to 3.96 meters) long. The temperature and speed of the partially oriented fiber 208 through the heating apparatus 202 can be varied as desired. For example, one or more temperature controlled zones may exist in the heating apparatus 202, with each zone having a temperature of from about 125° C. to about 160° C., more preferably from about 130° C. to about 160° C., or from about 150° C. to about 160° C. Preferably the temperature within a zone is controlled to vary less than ±2° C. (a total less than 4° C.), more preferably less than ±1° C. (a total less than 2° C.).

The path of the partially oriented fiber 208 in heating apparatus 202 can be an approximate straight line. The tension profile of the partially oriented fiber 208 during the post drawing process can be adjusted by adjusting the speed of the various rolls or by adjusting the temperature profile of the heating apparatus 202. For example, the tension of the partially oriented fiber 208 can be increased by increasing the difference between the speeds of consecutive driven rolls or decreasing the temperature in the heating apparatus 202. Preferably, the tension of the partially oriented fiber 208 in the heating apparatus 202 is approximately constant, or is increasing through the heating apparatus 202.

A heated fiber 224 exits the last oven 222 and can then be passed over the second set of rolls 206 to thereby form the finished highly oriented fiber product 226. The second set of rolls 206 can be driven rolls, which are operated to rotate at a desired speed to set the draw ratio for the coated partially oriented yarn and to remove the heated fiber 222 from the heating apparatus 202. The second set of rolls 206 can include a plurality of individual rolls 228. Although the second set of rolls 206 includes a total of seven individual rolls 228 as shown in FIG. 1, the number of individual rolls 228 can be higher or lower, depending upon the desired configuration. Additionally, the number of individual rolls 228 in the second set of rolls 206 can be the same as or different than the number of individual rolls 210 in the first set of rolls 204. Preferably, the second set of rolls 206 can be cold, so that the finished highly oriented fiber product 226 is cooled to a temperature below at least about 90° C. under tension to preserve its orientation and morphology.

Figure 2:
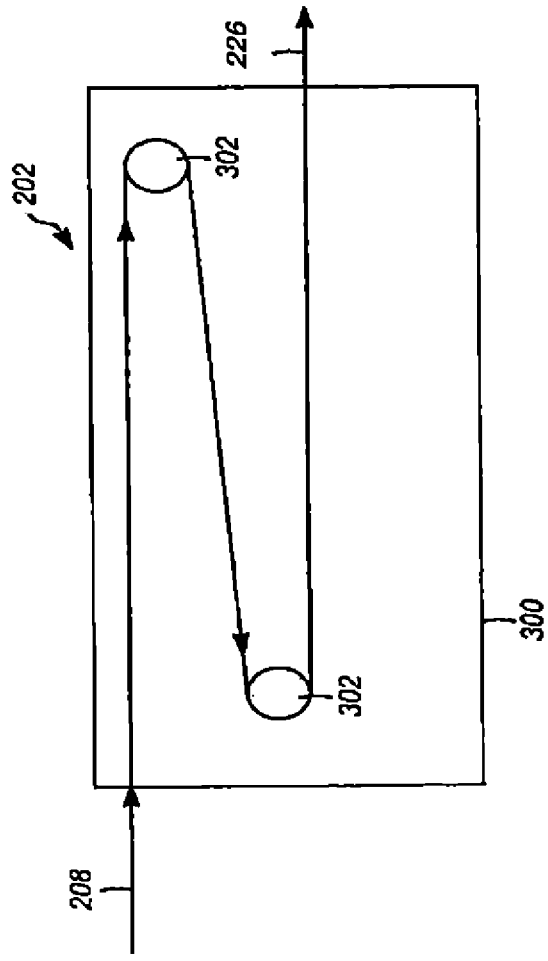
FIG. 2 illustrates an example of a post-draw process utilizing a heating apparatus incorporating a single oven having internal draw rolls.

An alternative embodiment of the heating apparatus 202 is illustrated in FIG. 2. As shown in FIG. 2, the heating apparatus 202 can include one or more ovens, such as a single oven 300. Each oven is preferably a forced convection air oven having the same conditions as described above with reference to FIG. 1. The oven 300 can have any suitable length, and in one example can be from about 10 feet to about 20 feet (3.05 to 6.10 meters) long. The oven 300 can include one or more intermediate rolls 302, over which the partially oriented fiber 208 can be passed in the oven 300 to change its direction in order to increase the path of travel of the partially oriented fiber 208 within the heating apparatus 202. Each of the one or more intermediate rolls 302 can be a driven roll that rotates at a predetermined speed, or an idler roll that can rotate freely as the partially oriented fiber 208 passes over it. Additionally, each of the one or more intermediate rolls 302 can be located internal to the oven 300, as shown, or alternatively one or more intermediate rolls 302 can be located external to the oven 300. Utilization of the one or more intermediate rolls 302 increases the effective length of the heating apparatus 202. Any suitable number of intermediate rolls can be utilized in order to provide the desired total fiber path length. Exiting the heating apparatus 202 is a highly oriented fiber/yarn product 226.

In a preferred post drawing operation, post drawing is preferably conducted at a draw ratio of from about 1.8:1 to about 15:1, more preferably from about 2.5:1 to about 10:1, and most preferably at a draw ratio of from about 3.0:1 to about 4.5:1 to form a highly oriented yarn product having a tenacity of greater than 27 g/denier. More preferably, the resulting highly oriented, coated, treated fibers have a tenacity of at least about 30 g/denier, still more preferably have a tenacity of at least about 37 g/denier, still more preferably have a tenacity of at least about 45 g/denier, still more preferably have a tenacity of at least about 50 g/denier, still more preferably have a tenacity of at least about 55 g/denier and most preferably have a tenacity of at least about 60 g/denier. All tenacity measurements identified herein are measured at ambient room temperature. As used herein, the term "denier" refers to the unit of linear density, equal to the mass in grams per 9000 meters of fiber or yarn. The process can include final steps of cooling the highly oriented fiber product without tension or under tension to form a cooled highly oriented fiber product produced, and winding up the cooled, coated, treated highly oriented fiber product thereby produced into a spool or package to be stored for later use. As a primary beneficial feature of this process, the coating applied to the fibers allows the fiber surfaces to remain in a treated, surface energy enhanced state as the fibers remain in storage awaiting use, such as fabrication in to a ballistic composite, thereby improving commercial scalability of the fiber treating process.

In alternate embodiments, the post drawing operation may be delayed, wherein the protective coating on the coated, treated, partially oriented fiber/yarn is dried or allowed to dry without immediate further stretching, or post drawing may be skipped altogether. In these embodiments, the coated, treated, partially oriented fibers/yarn is wound into a spool or package. This stored fiber/yarn may then be stored for later stretching into a highly oriented fiber/yarn via a post drawing operation as described above, or stored for later use as a coated, treated, partially oriented fiber/yarn having a tenacity of 27 g/denier or less. These embodiments, however, are not preferred.

The fibers produced according to the processes of the invention may be fabricated into woven and/or non-woven fibrous materials that have superior ballistic penetration resistance. For the purposes of the invention, articles that have superior ballistic penetration resistance describe those which exhibit excellent properties against deformable projectiles, such as bullets, and against penetration of fragments, such as shrapnel. A "fibrous" material is a material that is fabricated from fibers, filaments and/or yarns, wherein a "fabric" is a type of fibrous material.

A non-woven fabric is preferably formed by stacking one or more fiber plies of randomly oriented fibers (e.g. a felt or a mat) or unidirectionally aligned, parallel fibers, and then consolidating the stack to form a fiber layer. A "fiber layer" as used herein may comprise a single-ply of non-woven fibers or a plurality of non-woven fiber plies. A fiber layer may also comprise a woven fabric or a plurality of consolidated woven fabrics. A "layer" describes a generally planar arrangement having both an outer top surface and an outer bottom surface. A "single-ply" of unidirectionally oriented fibers comprises an arrangement of generally non-overlapping fibers that are aligned in a unidirectional, substantially parallel array, and is also known in the art as a "unitape", "unidirectional tape", "UD" or "UDT." As used herein, an "array" describes an orderly arrangement of fibers or yarns, which is exclusive of woven fabrics, and a "parallel array" describes an orderly parallel arrangement of fibers or yarns. The term "oriented" as used in the context of "oriented fibers" refers to the alignment of the fibers as opposed to stretching of the fibers.

As used herein, "consolidating" refers to combining a plurality of fiber layers into a single unitary structure, with our without the assistance of a polymeric binder material. Consolidation can occur via drying, cooling, heating, pressure or a combination thereof. Heat and/or pressure may not be necessary, as the fibers or fabric layers may just be glued together, as is the case in a wet lamination process. The term "composite" refers to combinations of fibers with at least one polymeric binder material.

As described herein, "non-woven" fabrics include all fabric structures that are not formed by weaving. For example, non-woven fabrics may comprise a plurality of unitapes that are at least partially coated with a polymeric binder material, stacked/overlapped and consolidated into a single-layer, monolithic element, as well as a felt or mat comprising non-parallel, randomly oriented fibers that are preferably coated with a polymeric binder composition.

Most typically, ballistic resistant composites formed from non-woven fabrics comprise fibers that are coated with or impregnated with a polymeric or resinous binder material, also commonly known in the art as a "polymeric matrix" material. These terms are conventionally known in the art and describe a material that binds fibers together either by way of its inherent adhesive characteristics or after being subjected to well known heat and/or pressure conditions. Such a "polymeric matrix" or "polymeric binder" material may also provide a fabric with other desirable properties, such as abrasion resistance and resistance to deleterious environmental conditions, so it may be desirable to coat the fibers with such a binder material even when its binding properties are not important, such as with woven fabrics.

The polymeric binder material partially or substantially coats the individual fibers of the fiber layers, preferably substantially coating or encapsulating each of the individual fibers/filaments of each fiber layer. Accordingly, when a residual finish is present, a three-layer coating is therefore present in areas where the protective coating and polymeric binder material are applied on top of the residual finish, wherein each of the residual finish and the protective coating may both comprise at least one ethylene oxide-propylene oxide copolymer or any other poly(alkyl-oxide) polymer. Therefore, the final structure in areas where a residual finish is present is: fiber/residual finish/protective coating/polymeric binder, preferably wherein the residual finish preferably comprises less than or equal to about 0.5% by weight based on the weight of the fiber plus the weight of the residual finish, wherein the protective coating preferably comprises from about 0.1% to about 5% by weight based on the weight of the fiber plus the weight of the protective coating, most preferably about 2% by weight, and wherein the polymeric binder preferably comprises from about from about 7% to about 20%, most preferably from about 11% to about 16% by weight of the fibers plus the weight of the binder/matrix coating.

Suitable polymeric binder materials include both low modulus materials and high modulus materials. Low modulus polymeric matrix binder materials generally have a tensile modulus of about 6,000 psi (41.4 MPa) or less according to ASTM D638 testing procedures and are typically employed for the fabrication of soft, flexible armor, such as ballistic resistant vests. High modulus materials generally have a higher initial tensile modulus than 6,000 psi and are typically employed for the fabrication of rigid, hard armor articles, such as helmets.

Preferred low modulus materials include all of those described above as useful for the protective coating. Preferred high modulus binder materials include polyurethanes (both ether and ester based), epoxies, polyacrylates, phenolic/polyvinyl butyral (PVB) polymers, vinyl ester polymers, styrene-butadiene block copolymers, as well as mixtures of polymers such as vinyl ester and diallyl phthalate or phenol formaldehyde and polyvinyl butyral. A particularly preferred rigid polymeric binder material for use in this invention is a thermosetting polymer, preferably soluble in carbon-carbon saturated solvents such as methyl ethyl ketone, and possessing a high tensile modulus when cured of at least about $1 \times 10^6$ psi (6895 MPa) as measured by ASTM D638. Particularly preferred rigid polymeric binder materials are those described in U.S. Pat. No. 6,642,159, the disclosure of which is incorporated herein by reference. The rigidity, impact and ballistic properties of the articles formed from the composites of the invention are affected by the tensile modulus of the polymeric binder polymer coating the fibers. The polymeric binder, whether a low modulus material or a high modulus material, may also include fillers such as carbon black or silica, may be extended with oils, or may be vulcanized by sulfur, peroxide, metal oxide or radiation cure systems as is well known in the art.

Similar to the protective coating, a polymeric binder may be applied either simultaneously or sequentially to a plurality of fibers arranged as a fiber web (e.g. a parallel array or a felt) to form a coated web, applied to a woven fabric to form a coated woven fabric, or as another arrangement, to thereby impregnate the fiber layers with the binder. As used herein, the term "impregnated with" is synonymous with "embedded in" as well as "coated with" or otherwise applied with the coating where the binder material diffuses into a fiber layer and is not simply on a surface of fiber layers. The polymeric binder material may be applied onto the entire surface area of the individual fibers or only onto a partial surface area of the fibers, but most preferably the polymeric binder material is applied onto substantially all the surface area of each individual fiber forming a fiber layer of the invention. Where a fiber layer comprises a plurality of yarns, each fiber forming a single strand of yarn is preferably coated with the polymeric binder material.

The polymeric binder material may also be applied onto at least one array of fibers that is not part of a fiber web, followed by weaving the fibers into a woven fabric or followed by formulating a non-woven fabric. Techniques of forming woven fabrics are well known in the art and any fabric weave may be used, such as plain weave, crowfoot weave, basket weave, satin weave, twill weave and the like. Plain weave is most common, where fibers are woven together in an orthogonal 0°/90° orientation. Also useful are 3D weaving methods wherein multi-layer woven structures are fabricated by weaving warp and weft threads both horizontally and vertically.

Techniques for forming non-woven fabrics are also well known in the art. In a typical process, a plurality of fibers are arranged into at least one array, typically being arranged as a fiber web comprising a plurality of fibers aligned in a substantially parallel, unidirectional array. The fibers are then coated with the binder material and the coated fibers are formed into non-woven fiber plies, i.e. unitapes. A plurality of these unitapes are then overlapped atop each other and consolidated into multi-ply, single-layer, monolithic element, most preferably wherein the parallel fibers of each single-ply are positioned orthogonally to the parallel fibers of each adjacent single-ply, relative to the longitudinal fiber direction of each ply. Although orthogonal (0°/90°) fiber orientations are preferred, adjacent plies can be aligned at virtually any angle between about 0° and about 90° with respect to the longitudinal fiber direction of another ply. For example, a five ply non-woven structure may have plies oriented at a 0°/45°/90°/45°/0° or at other angles. Such rotated unidirectional alignments are described, for example, in U.S. Pat. Nos. 4,457,985; 4,748,064; 4,916,000; 4,403,012; 4,623,574; and 4,737,402, all of which are incorporated herein by reference to the extent not incompatible herewith.

This stack of overlapping, non-woven fiber plies is then consolidated under heat and pressure, or by adhering the coatings of individual fiber plies to each other to form a non-woven composite fabric. Most typically, non-woven fiber layers or fabrics include from 1 to about 6 adjoined fiber plies, but may include as many as about 10 to about 20 plies as may be desired for various applications. The greater the number of plies translates into greater ballistic resistance, but also greater weight.

Generally, a polymeric binder coating is necessary to efficiently merge, i.e. consolidate, a plurality of non-woven fiber plies. Coating woven fabrics with a polymeric binder material is preferred when it is desired to consolidate a plurality of stacked woven fabrics into a complex composite, but a stack of woven fabrics may be may be attached by other means as well, such as with a conventional adhesive layer or by stitching.

Methods of consolidating fiber plies to form fiber layers and composites are well known, such as by the methods described in U.S. Pat. No. 6,642,159. Consolidation can occur via drying, cooling, heating, pressure or a combination thereof. Heat and/or pressure may not be necessary, as the fibers or fabric layers may just be glued together, as is the case in a wet lamination process. Typically, consolidation is done by positioning the individual fiber plies on one another under conditions of sufficient heat and pressure to cause the plies to combine into a unitary fabric. Consolidation may be done at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. When heating, it is possible that the polymeric binder coating can be caused to stick or flow without completely melting. However, generally, if the polymeric binder material is caused to melt, relatively little pressure is required to form the composite, while if the binder material is only heated to a sticking point, more pressure is typically required. As is conventionally known in the art, consolidation may be conducted in a calendar set, a flat-bed laminator, a press or in an autoclave. Consolidation may also be conducted by vacuum molding the material in a mold that is placed under a vacuum. Vacuum molding technology is well known in the art. Most commonly, a plurality of orthogonal fiber webs are "glued" together with the binder polymer and run through a flat bed laminator to improve the uniformity and strength of the bond. Further, the consolidation and polymer application/bonding steps may comprise two separate steps or a single consolidation/lamination step.

Alternately, consolidation may be achieved by molding under heat and pressure in a suitable molding apparatus. Generally, molding is conducted at a pressure of from about 50 psi (344.7 kPa) to about 5,000 psi (34,470 kPa), more preferably about 100 psi (689.5 kPa) to about 3,000 psi (20,680 kPa), most preferably from about 150 psi (1,034 kPa) to about 1,500 psi (10,340 kPa). Molding may alternately be conducted at higher pressures of from about 5,000 psi (34,470 kPa) to about 15,000 psi (103,410 kPa), more preferably from about 750 psi (5,171 kPa) to about 5,000 psi, and more preferably from about 1,000 psi to about 5,000 psi. The molding step may take from about 4 seconds to about 45 minutes. Preferred molding temperatures range from about 200° F. (~93° C.) to about 350° F. (~177° C.), more preferably at a temperature from about 200° F. to about 300° F. and most preferably at a temperature from about 200° F. to about 280° F. The pressure under which the fiber layers and fabric composites of the invention are molded has a direct effect on the stiffness or flexibility of the resulting molded product. Particularly, the higher the pressure at which they are molded, the higher the stiffness, and vice-versa. In addition to the molding pressure, the quantity, thickness and composition of the fiber plies and polymeric binder coating type also directly affects the stiffness of the articles formed from the composites.

While each of the molding and consolidation techniques described herein are similar, each process is different. Particularly, molding is a batch process and consolidation is a generally continuous process. Further, molding typically involves the use of a mold, such as a shaped mold or a match-die mold when forming a flat panel, and does not necessarily result in a planar product. Normally consolidation is done in a flat-bed laminator, a calendar nip set or as a wet lamination to produce soft (flexible) body armor fabrics. Molding is typically reserved for the manufacture of hard armor, e.g. rigid plates. In either process, suitable temperatures, pressures and times are generally dependent on the type of polymeric binder coating materials, polymeric binder content, process used and fiber type.

The fabrics/composites of the invention may also optionally comprise one or more thermoplastic polymer layers attached to one or both of its outer surfaces. Suitable polymers for the thermoplastic polymer layer non-exclusively include polyolefins, polyamides, polyesters (particularly polyethylene terephthalate (PET) and PET copolymers), polyurethanes, vinyl polymers, ethylene vinyl alcohol copolymers, ethylene octane copolymers, acrylonitrile copolymers, acrylic polymers, vinyl polymers, polycarbonates, polystyrenes, fluoropolymers and the like, as well as co-polymers and mixtures thereof, including ethylene vinyl acetate (EVA) and ethylene acrylic acid. Also useful are natural and synthetic rubber polymers. Of these, polyolefin and polyamide layers are preferred. The preferred polyolefin is a polyethylene. Non-limiting examples of useful polyethylenes are low density polyethylene (LDPE), linear low density polyethylene (LLDPE), medium density polyethylene (MDPE), linear medium density polyethylene (LMDPE), linear very-low density polyethylene (VLDPE), linear ultra-low density polyethylene (ULDPE), high density polyethylene (HDPE) and co-polymers and mixtures thereof. Also useful are SPUNFAB® polyamide webs commercially available from Spunfab, Ltd, of Cuyahoga Falls, Ohio (trademark registered to Keuchel Associates, Inc.), as well as THERMOPLAST™ and HELIOPLAST™ webs, nets and films, commercially available from Protechnic S.A. of Cernay, France. Such a thermoplastic polymer layer may be bonded to the fabric/composite surfaces using well known techniques, such as thermal lamination. Typically, laminating is done by positioning the individual layers on one another under conditions of sufficient heat and pressure to cause the layers to combine into a unitary structure. Lamination may be conducted at temperatures ranging from about 95° C. to about 175° C., preferably from about 105° C. to about 175° C., at pressures ranging from about 5 psig (0.034 MPa) to about 100 psig (0.69 MPa), for from about 5 seconds to about 36 hours, preferably from about 30 seconds to about 24 hours. Such thermoplastic polymer layers may alternatively be bonded to said outer surfaces with hot glue or hot melt fibers as would be understood by one skilled in the art.

The thickness of the fabrics/composites will correspond to the thickness of the individual fibers/tapes and the number of fiber/tape plies or layers incorporated into the fabric/composite. For example, a preferred woven fabric will have a preferred thickness of from about 25 μm to about 600 μm per ply/layer, more preferably from about 50 μm to about 385 μm and most preferably from about 75 μm to about 255 μm per ply/layer. A preferred two-ply non-woven fabric will have a preferred thickness of from about 12 μm to about 600 μm, more preferably from about 50 μm to about 385 μm and most preferably from about 75 μm to about 255 μm. Any thermoplastic polymer layers are preferably very thin, having preferred layer thicknesses of from about 1 μm to about 250 μm, more preferably from about 5 μm to about 25 μm and most preferably from about 5 μm to about 9 μm. Discontinuous webs such as SPUNFAB® non-woven webs are preferably applied with a basis weight of 6 grams per square meter (gsm). While such thicknesses are preferred, it is to be understood that other thicknesses may be produced to satisfy a particular need and yet fall within the scope of the present invention.

To produce a fabric article having sufficient ballistic resistance properties, the total weight of the binder/matrix coating preferably comprises from about 2% to about 50% by weight, more preferably from about 5% to about 30%, more preferably from about 7% to about 20%, and most preferably from about 11% to about 16% by weight of the fibers plus the weight of the binder/matrix coating, wherein 16% is most preferred for non-woven fabrics. A lower binder/matrix content is appropriate for woven fabrics, wherein a polymeric binder content of greater than zero but less than 10% by weight of the fibers plus the weight of the coating is typically most preferred. This is not intended as limiting. For example, phenolic/PVB impregnated woven aramid fabrics are sometimes fabricated with a higher resin content of from about 20% to about 30%, although around 12% content is typically preferred.

The fabrics of the invention may be used in various applications to form a variety of different ballistic resistant articles using well known techniques, including flexible, soft armor articles as well as rigid, hard armor articles. For example, suitable techniques for forming ballistic resistant articles are described in, for example, U.S. Pat. Nos. 4,623,574, 4,650,710, 4,748,064, 5,552,208, 5,587,230, 6,642,159, 6,841,492 and 6,846,758, all of which are incorporated herein by reference to the extent not incompatible herewith. The composites are particularly useful for the formation of hard armor and shaped or unshaped sub-assembly intermediates formed in the process of fabricating hard armor articles. By "hard" armor is meant an article, such as helmets, panels for military vehicles, or protective shields, which have sufficient mechanical strength so that it maintains structural rigidity when subjected to a significant amount of stress and is capable of being freestanding without collapsing. Such hard articles are preferably, but not exclusively, formed using a high tensile modulus binder material.

The structures can be cut into a plurality of discrete sheets and stacked for formation into an article or they can be formed into a precursor which is subsequently used to form an article. Such techniques are well known in the art. In a most preferred embodiment of the invention, a plurality of fiber layers are provided, each comprising a consolidated plurality of fiber plies, wherein a thermoplastic polymer film is bonded to at least one outer surface of each fiber layer either before, during or after a consolidation step which consolidates the plurality of fiber plies, wherein the plurality of fiber layers are subsequently merged by another consolidation step which consolidates the plurality of fiber layers into an armor article or sub-assembly of an armor article.

As described in co-pending U.S. application Ser. Nos. 13/594,715; 13/594,735; 13/594,747; 13/594,757; 13/594,763; 13/602,371 and 13/602,381 which are identified above, there is a direct correlation between backface signature of a ballistic resistant composite and the tendency of the component fibers of a ballistic resistant composite to delaminate from each other and/or delaminate from fiber surface coatings as a result of a projectile impact. Backface signature, also known in the art as "backface deformation," "trauma signature" or "blunt force trauma," is the measure of the depth of deflection of body armor due to a bullet impact. When a bullet is stopped by composite armor, potentially resulting blunt trauma injuries may be as deadly to an individual as if the bullet had penetrated the armor and entered the body. This is especially consequential in the context of helmet armor, where the transient protrusion caused by a stopped bullet can still cross the plane of the wearer's skull and cause debilitating or fatal brain damage.

A treatment such as plasma treatment or corona treatment improves the ability of coatings to adsorb to, adhere to or bond to the fiber surface, thereby reducing the tendency of fiber surface coatings to delaminate. The treatment accordingly has been found to reduce composite backface deformation upon a projectile impact, which is desirable. The protective coating described herein preserves the surface treatment so that it is not necessary to immediately fabricate the treated yarns into composites, but rather they may be stored for future use. Fibers treated according to the inventive process also remain processable despite removal of the fiber finish, and retain the fiber physical properties following treatment relative to untreated fibers.

The following examples serve to illustrate the invention.

Example 1

A plurality of 1100 denier highly oriented UHMW PE yarns having a tenacities of 39 g/denier were installed onto the unwind creel of a stand-alone fiber treating line rather than being installed onto the unwind creel of a unidirectional impregnation coater. The yarns were unwound and washed with deionized water to substantially remove their pre-existing fiber surface finish. The washed yarns were dried and then immediately thereafter treated in an atmospheric pressure plasma treater (Enercon Plasma3 Station Model APT12DF-150/2, from Enercon Industries Corp., having 29-inch wide electrodes) maintained at 760 mm Hg wherein they were subjected to a plasma-treating flux of from about 16 W/ft$^2$/min to about 53 W/ft$^2$/min in an atmosphere comprising 90% argon gas and 10% oxygen.

The plasma treated yarns were then coated in the fiber treating line with a protective coating composition. The composition comprised greater than 70% by weight of an ethylene oxide-polypropylene oxide random copolymer. Prior to application, the coating composition was diluted such that the coating comprised either 2.5% or 5.0% solids by weight of the diluted composition. The protective coating on the yarns is then dried at 100° C. and after drying the protective coating weight was approximately 2% based on the weight of the coating plus the weight of the yarn, irrespective of the coating solids weight. The solids % of the dilution had no impact on the results, with the greater concentration only permitting faster processing speed. The dry, coated yarns were then wound back into spools (one spool per yarn end) and set aside for future processing instead of directly forming them into unidirectional prepregs.

After a delay of at least 8 weeks, each coated yarn was installed onto the unwind creel of a unidirectional impregnation coater. The yarns were unwound and coated in-line with a binder/matrix composition comprising an aqueous, anionic, aliphatic polyester-based polyurethane dispersion by passing the yarns through a container holding the binder/matrix composition. The binder/matrix weight was about 15 wt. % based on the weight of the binder/matrix plus the weight of the yarn, independent of the weight of the protective coating. Together with the protective coating, the combined coating weights on the yarn is 17% by weight. The polyurethane coated yarns were then spread according to a method described in commonly-owned U.S. Pat. No. 8,652,570, which is incorporated herein by reference. Particularly, the polyurethane coated yarns were fed into a spreading station which is formed from two stainless steel parallel metal bars of 1 inch (2.54 cm) diameter and spaced apart by 0.29 inches (7.37 mm). The yarn was fed under the first spreader bar and then over the second spreader bar to form a spread fiber network. The spread fiber network was nipped onto a silicone-coated carrier paper, dried and wound up into a roll of unidirectional tape. Next, as second identical roll was produced. Finally, one of these two rolls was cut into squares and manually cross-plied to the second roll by use of a flat-bed laminator to form a 2-ply prepreg.

The 2-ply prepreg, scanned photographs of which are presented in FIGS. 3A and 3B, was then inspected for yarn spreading uniformity, clumping of yarns and gaps between yarns. No visible gapping was recognized by the unaided eye. Further testing was then conducted as summarized in Example 2 (Comparative).

Example 2 (Comparative)

Example 2 was produced by the same method as Example 1 except that the plasma treated yarns were coated with an aqueous, anionic, aliphatic, polyester-based polyurethane dispersion rather than a composition comprising an ethylene oxide-polypropylene oxide random copolymer. The samples of Example 1 and Example 2 differed only in the composition of the protective coating following the plasma treatment. After drying, the polyurethane protective coating weight was 2% based on the weight of the coating plus the weight of the yarn. The dry, coated yarns were then wound back onto spools as per Example 1 and set aside for future processing. After at least eight weeks the treated and coated yarns were installed onto the unwind creel of a unidirectional impregnation coater of coated in-line with a binder/matrix composition comprising an aqueous, anionic, aliphatic, polyester-based polyurethane dispersion. The binder/matrix weight was about 15 wt. % based on the weight of the binder/matrix plus the weight of the yarn, independent of the weight of the protective coating. Together with the protective coating, the combined coating weights on the yarn is 17% by weight. The polyurethane coated yarns were then spread, nipped onto a silicone-coated carrier paper, dried and wound up as a roll of unidirectional tape, as per Example 1.

Two rolls of this unidirectional tape were then manually cross-plied as per Example 1 to form a 2-ply prepreg.

Figure 4A:
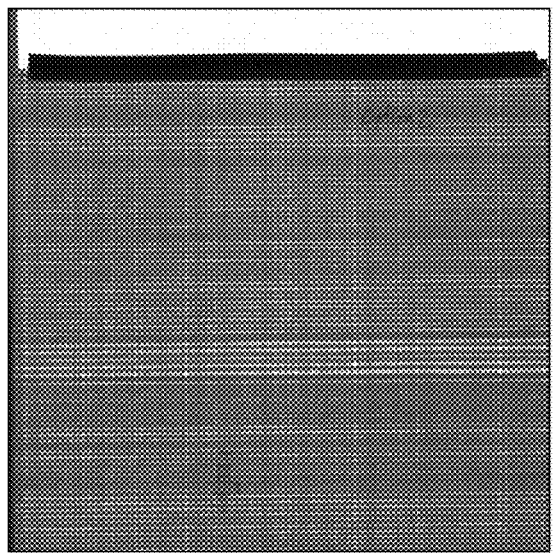
FIG. 4(a) is a scanned image of a 2-ply (0°/90°) non-woven composite of the prior art that has been plasma treated and coated with polyurethane protective coating, which image shows gaps between fibers and fiber clumping.
Figure 4B:
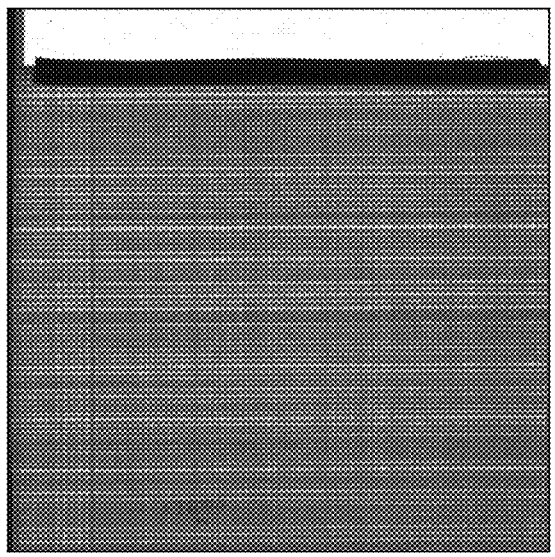
FIG. 4(b) is a scanned image of the reverse surface of the 2-ply (0°/90°) non-woven composite shown in FIG. 4(a).

The 2-ply prepreg, scanned photographs of which are presented in FIGS. 4A and 4B, was then inspected for yarn spreading uniformity, clumping of yarns and gaps between yarns. Pronounced visible gapping was recognized by the unaided eye.

It was clear that use of a polyurethane-based protective coating in Example 2 was not as beneficial as the use of the protective coating comprising ethylene oxide-propylene random copolymer in Example 1.

For greater specificity, each of the samples were then analyzed by scanning (at 300 DPI, Transmission Mode, Gray Scale, Auto Contrast Enhancement) an image of an 8 inch by 8 inch square sample of each prepreg and measuring the gray scale profile of the scanned images across the fiber network (i.e. across the "Shield"). The scanned images of the Example 1 sample are presented in FIGS. 3A (front side) and 3B (back side). The scanned images of the Example 2 sample are presented in FIGS. 4A (front side) and 4B (back side). The results of the gray scale profile analysis for each sample is graphically presented in FIGS. 5-7. As seen in said Figures, the samples prepared with the ethylene oxide-polypropylene oxide random copolymer had more constant and consistent grays than the samples that were coated with a polyurethane protective coating.

In addition to the gray scale analysis, Fast Fourier Transform analysis was performed on the scanned images of Example 1 and Example 2 to analyze and plot the visible periodicity in each of the scanned images versus their relative occurrence or strength. As shown in FIG. 8, FFT analysis of the more uniformly spread Example 1 prepreg, where the protective coating is based on ethylene oxide-propylene oxide random copolymer, did not show evidence of strong, repeating visible patterns. This shows that this poly(alkyl oxide) type of protective coating does not hinder the ability of the treated fiber to be spread into a uniform fiber web. This is contrasted with FFT analysis of the Example 2 prepreg, also shown in FIG. 8, where the protective coating is based on a polyurethane resin. The plot of this material shows a distinct, pronounced peak at 2.3 mm. This strong peak exactly matches the fiber spacing through the last comb of the fiber spreading process and implies that the subsequent spreading process was not as effective for Example 2 with its polyurethane protective coating. This is likely because the polyurethane protective coating of Example 2 tended to bind together the individual filaments of the fiber bundles, preventing them from separating and spreading during the subsequent fiber spreading process. This difference in the two FFT plots in FIG. 8 correlates with the differences that are seen in the scans of FIG. 3A, FIG. 3B, FIG. 4A and FIG. 4B. In the inventive samples shown in FIG. 8, the FFT spectral amplitude exhibits no peak.

Example 3

Four 3300 denier partially oriented UHMW PE yarns are unwound from four spools at a rate of 6.7 m/min and washed to remove a pre-existing finish from the yarns. To wash the yarns, they are first directed through a pre-soak water bath containing de-ionized water with an approximate residence time in the bath of about 18 seconds. After exiting the pre-soak water bath, the yarns are rinsed with water nozzles at a water pressure of approximately 42 psi and with a water flow rate of approximately 0.5 gallons per minute per nozzle with the water at room temperature. The washed yarns are then dried and plasma treated. Plasma treatment is conducted by passing the yarns through an atmospheric plasma treater (model: Enercon Plasma3 Station Model APT12DF-150/2, from Enercon Industries Corp., having 29-inch wide electrodes) having an atmosphere comprising 90% argon & 10% oxygen at a rate of approximately 6 m/min. The plasma treater is set to a power of 2 kW, thereby treating the yarns with an energy flux of 54 watts/ft$^2$/min. The residence time of the yarns within the plasma treater is approximately 2 seconds. Treatment is conducted under standard atmospheric pressure.

The plasma treated yarns are then immediately coated as in Example 1 with approximately 2 wt. % of a protective coating composition, by weight of the fiber plus the coating, which coating comprises greater than 70% by weight of an ethylene oxide-polypropylene oxide random copolymer. The yarns are then conveyed into and through a heated oven having an oven temperature of 150° C., wherein the coated yarns are drawn to convert them into highly oriented yarns while simultaneously drying the protective coating on the yarns. Each dried highly oriented yarn is then rewound on a new spool. The final tenacity of each highly oriented yarn is then measured, and the average final tenacity of each highly oriented yarn is greater than 45.0 g/denier.

As per Example 1, after a delay of at least 8 weeks, each coated yarn is installed onto the unwind creel of a unidirectional impregnation coater. The yarns are unwound and coated in-line with a binder/matrix composition comprising an aqueous, anionic, aliphatic polyester-based polyurethane dispersion by passing the yarns through a container holding the binder/matrix composition. The binder/matrix weight was about 15 wt. % based on the weight of the binder/matrix plus the weight of the yarn, independent of the weight of the protective coating. Together with the protective coating, the combined coating weights on the yarn is 17% by weight. The polyurethane coated yarns are then spread according to a method described in commonly-owned U.S. Pat. No. 8,652,570 to form a spread fiber network. The spread fiber network was nipped onto a silicone-coated carrier paper, dried and wound up into a roll of unidirectional tape. Next, as second identical roll was produced. Finally, one of these two rolls was cut into squares and manually cross-plied to the second roll by use of a flat-bed laminator to form a 2-ply prepreg.

The 2-ply prepreg is then is then inspected for yarn spreading uniformity, clumping of yarns and gaps between yarns. No visible gapping is recognized by the unaided eye.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A coated fiber having at least some fiber surface area that is not covered by a fiber surface finish, said fiber having a dry protective coating on at least a portion of the fiber surface area that is not covered by the fiber surface finish and wherein said fiber is encapsulated by the dry protective coating, wherein said dry protective coating comprises at least one poly(alkyl-oxide) polymer, and wherein said fiber has a tenacity of at least about 18 g/denier.

2. The coated fiber of claim 1 wherein said fiber has a tenacity of at least about 18 g/denier up to 27 g/denier.

3. The coated fiber of claim 1 wherein said fiber has a tenacity of greater than 27 g/denier.

4. The coated fiber of claim 1 wherein said protective coating comprises greater than 70% by weight of an ethylene oxide-polypropylene oxide copolymer.

5. The coated fiber of claim 1 wherein said protective coating consists essentially of at least one poly(alkyl-oxide) polymer.

6. The coated fiber of claim 1 wherein said protective coating consists of at least one poly(alkyl-oxide) polymer.

7. The coated fiber of claim 1 wherein said protective coating consists essentially of at least one ethylene oxide-polypropylene oxide copolymer.

8. The coated fiber of claim 1 wherein said protective coating consists of at least one ethylene oxide-polypropylene oxide copolymer.

9. The coated fiber of claim 1 wherein said protective coating comprises at least one ethylene oxide-polypropylene oxide copolymer and at least one surfactant.

10. The coated fiber of claim 1 wherein said protective coating consists essentially of at least one ethylene oxide-polypropylene oxide copolymer and at least one surfactant.

11. The coated fiber of claim 1 wherein said protective coating consists of at least one ethylene oxide-polypropylene oxide copolymer and at least one surfactant.

12. The coated fiber of claim 1 wherein substantially all of the fiber surface area is covered by the protective coating.

13. The coated fiber of claim 1 wherein all of the fiber surface area is covered by the protective coating.

14. The coated fiber of claim 1 wherein said fiber comprises a plurality of filaments, wherein each filament has a surface area, wherein all or substantially all of the surface area of each filament is covered by the protective coating.

15. A process comprising:
a) providing one or more fibers having at least some exposed fiber surface areas that are at least partially free of a fiber surface finish, wherein said one or more fibers each have a tenacity of at least about 18 g/denier;
b) treating the exposed fiber surface areas under conditions effective to enhance the surface energy of the fiber surface areas; and
c) applying a protective coating onto at least a portion of the treated fiber surface areas to thereby form coated, treated fibers, said protective coating comprising at least one poly(alkyl-oxide) polymer, wherein each fiber is encapsulated by the protective coating and
d) drying the protective coating.

16. A coated, treated fiber produced by the process of claim 15.

* * * * *